(12) United States Patent
Patel et al.

(10) Patent No.: US 8,429,224 B2
(45) Date of Patent: Apr. 23, 2013

(54) GAMING BROWSER MANAGER CLIENT SYSTEM AND METHOD

(75) Inventors: Pravinkumar Patel, Las Vegas, NV (US); Robert W. Crowder, Las Vega, NV (US); Bryan M. Kelly, Alamo, CA (US); John E. Link, Manteca, CA (US); Anthony E. Green, Henderson, NV (US); Mettu R. Reddy, Marshfield, WI (US)

(73) Assignee: Bally Gaming, Inc., Las Vegas, NV (US)

(*) Notice: Subject to any disclaimer, the term of this patent is extended or adjusted under 35 U.S.C. 154(b) by 1456 days.

(21) Appl. No.: 11/938,746

(22) Filed: Nov. 12, 2007

(65) Prior Publication Data
US 2009/0093309 A9   Apr. 9, 2009

Related U.S. Application Data

(63) Continuation of application No. 11/938,746, filed on Nov. 12, 2007, which is a continuation of application No. 10/751,006, filed on Dec. 31, 2003, now Pat. No. 7,762,885, which is a continuation of application No. 09/433,523, filed on Nov. 3, 1999, now Pat. No. 6,758, 755, which is a continuation-in-part of application No. 09/040,654, filed on Mar. 17, 1998, now Pat. No. 6, 007,426, which is a continuation of application No. 08/746,755, filed on Nov. 14, 1996, now Pat. No. 5, 816,918.

(51) Int. Cl.
*G06F 15/16* (2006.01)

(52) U.S. Cl.
USPC ............... 709/203; 463/40; 463/42; 345/1.1; 345/30

(58) Field of Classification Search .................. 709/203, 709/217, 219, 223; 463/40, 42; 345/1.1, 345/30, 156, 619
See application file for complete search history.

(56) References Cited

U.S. PATENT DOCUMENTS

| | | | | |
|---|---|---|---|---|
| 5,695,400 A | * | 12/1997 | Fennell et al. | 463/42 |
| 5,697,844 A | * | 12/1997 | Von Kohorn | 463/40 |
| 5,774,870 A | * | 6/1998 | Storey | 705/14.27 |
| 5,779,549 A | * | 7/1998 | Walker et al. | 463/42 |
| 6,223,215 B1 | * | 4/2001 | Hunt et al. | 709/217 |

* cited by examiner

*Primary Examiner* — Frantz Jean
(74) *Attorney, Agent, or Firm* — Brooke Quist; Marv Hein

(57) ABSTRACT

A browser manager server is able to initialize and configure one or more browser windows on a gaming device display screen. The browser manager has the ability to configure specific URLs for each browser window, configure and Z-order depth for each window, set window size and position, and call functions on the browser pages. A browser client side application on a gaming device is capable of creating multiple windows on an electronic gaming device and responding to said server configuration or browser message commands.

30 Claims, 20 Drawing Sheets

GAMING BROWSER MANAGER CLIENT SYSTEM AND METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is a continuation of U.S. patent application Ser. No. 11/938,746 filed Nov. 12, 2007, which is a continuation of U.S. patent application Ser. No. 10/751,006 filed Dec. 31, 2003 now U.S. Pat. No. 7,762,885, which is a continuation of U.S. patent application Ser. No. 09/433,523 filed Nov. 3, 1999, now U.S. Pat. No. 6,758,755 issued Jul. 6, 2004, which is a continuation-in-part of U.S. patent application Ser. No. 09/040,654 filed Mar. 17, 1998, now U.S. Pat. No. 6,007,426 issued Dec. 28, 1999, which is a continuation of U.S. patent application Ser. No. 08/746,755 filed Nov. 14, 1996, now U.S. Pat. No. 5,816,918 issued Oct. 6, 1998, all of which are hereby incorporated by reference herein in their entirety.

FIELD OF THE INVENTION

These disclosed embodiments pertain generally to gaming systems and methods. More particularly, the disclosed embodiments relate to a browser method and system for managing, monitoring, controlling, and modifying game- or gaming-related activities.

BACKGROUND

For some time, casino kiosks have been used to bring server-based content to users. Additionally, games on browsers have been utilized in the online and arcade markets. U.S. Pat. No. 5,816,918 by Kelly, entitled Prize Redemption System For Games, discloses a browser on a pay to play gaming machine for use in both arcades and casinos. Moreover, U.S. Pat. No. 6,645,068 by Kelly, entitled Profile Driven Network Game And Prize Redemption System, discloses further enablement of games and advertising for browser based gaming devices.

SUMMARY

Briefly, and in general terms, disclosed herein are systems and methods for providing one or more gaming machines having a primary display and a secondary display, as well as a browser manager operating system and method. A browser manager server is able to initialize and configure one or more browser windows on a gaming device display screen. The browser manager has the ability to configure specific URLs for each browser window, configure and Z-order depth for each window, set window size and position, and call functions on the browser pages. A browser client side application on a gaming device is capable of creating multiple windows on an electronic gaming device and responding to said server configuration or browser message commands.

Typically, the primary display is used to present the primary game of the machine, while the secondary display is used to present other applications including, by way of example only, and not by way of limitation: (1) pay-tables related to the primary game; (2) other games, such as Bingo, Keno, Sports book; (3) group play or group bonus games; (4) web pages, animation and graphics; and (5) player statistics, and game statistics.

Other content may be provided by a central server, such as entertainment content in which the secondary display hosts a browser linked to the central server. All of these applications may be displayed and accessed from a single display using multi-sessions browser technology.

In one embodiment, the gaming machine is transformed into a multi-application device capable of playing a primary game, while multiple secondary games may be accessed and played on the secondary display. In one particular non-limiting embodiment, the primary game is a video poker game, while the secondary playable application is live Bingo connected to the casino's bingo room. In another embodiment, the secondary display is used to present video or audio feeds of the bingo room. In addition, the player preferably is able to use his existing credits on the primary game to place wagers on the secondary game. In this regard, the player may use his player card to gain (previously authorized) access to the secondary game.

This embodiment provides the player with more play and gambling options without having to leave the gaming machine, which is turn translates into increased revenues for the casino. Such an embodiment also provides the platform configuration to transform a gaming machine into a full multi-media device.

In one embodiment, a browser manager operating system and method 10 for use with game devices, systems, and methods is disclosed that enables users to perform browser activities from a gaming machine. In such embodiments, a system and method are described that include the downloading, packaging, and presenting server-side content, including 3rd party application content, to the gaming machine, and specifically to its secondary display. One embodiment of the browser manager operating system 10 includes two main modules or components: a Browser Manager (BrowserMgr) and a Transaction Manager (TM).

In an aspect of one embodiment, the Browser Manager communicates with the game provider on one hand to receive and package content, and communicates with the electronic gaming machine on the other hand to display this content and interact with the player through the browser window. By way of example only, and not by way of limitation, major functions of the Browser Manager include: (1) establishing a direct link to the electronic gaming machine; (2) establishing a direct link with the game provider to securely download content; (3) receiving and packaging the content; (4) transmitting the content to the secondary display or providing a URL to the content; (5) managing the browser layouts and active sessions; and (6) accepting wagers from the player and confirming wagers to the player.

In another aspect of one embodiment, the Transaction Manager functions as a mediator and negotiator between the application/game provider and the electronic gaming machine. The Transaction Manager may also acts as a Banker in order to facilitate the placement, acceptance and disposition of wagers. By way of example only, and not by way of limitation, major functions of the Transaction Manager include: (1) enabling a service discovery method (SDM) that detects the presence of playable games in the casino; (2) enabling a registration method that allows the game provider to enroll with Transaction Manager; (3) enabling a registration method that allows the electronic gaming machine to enroll with the Transaction Manager; (4) interpreting the services and parameters of the game provided; (5) authorizing the player to place wagers based on player's permissions (using player-tracking system); (6) accepting wagers by negotiating with the game provider; (7) confirming wagers by printing a receipt at the gaming machine; (8) enabling disposition of the bet by confirming the win or loss through a cashier or cash-out booth; (9) mediating with the Browser Manager to authorize content from the game provider; and (10) logging all transactions.

In one embodiment involving a player at an electronic game machine, when the player inserts his player card, the Transaction Manager determines which applications the player is permitted to see. In this regard, the screen may be physically organized accordingly, and the content may be distributed to each player and session by the Browser Manager.

In another aspect of one embodiment, the permissions to access the different games or applications are based on the player's preferences or on prior authorization obtained from a casino game host. When the player selects a certain session, the application in that session may be brought to the foreground in a ready state. Thus, some embodiments may have multiple active sessions; therefore, the player can potentially play multiple games or browse multiple applications. However, if a certain application has not been played for a certain period of time, the session may become inactive and the application dropped. In some embodiments, the player may be able to re-activate the application by pushing an "enroll" or "log in" button.

For example, in one specific, non-limiting embodiment, a player engages in a game of video poker using the primary display. If the player is authorized to access tournament games, bingo, keno, and sports wagering, the display shows four different sessions hosting each of the different applications represented by four tabs at the bottom of the screen, which are labeled Tournament, Bingo, Keno, Sports, thus allowing the player to switch between the sessions and place wagers.

In another embodiment that implements a standard casino game (e.g., video poker, slots, and the like), a player is able to play the casino game just like the primary game. However, in the case of a group play game (e.g., tournament, bingo, keno, and the like.), the player may be able to place a wager and get a confirmation ticket printed at the electronic gaming machine. In such an embodiment, the Transaction Manager may confirm the wager and send a bar-coded confirmation to be printed on the electronic gaming machine's printer. The player may then place another wager or continue playing at the primary game or secondary game.

In still another embodiment, after a certain period of time, when the game for which the player has placed a wager is over, the player can take the ticket to a cashier who may verify the win or loss by scanning the bar-coded ticket using a scanner linked to Transaction Manager.

If the ticket is a winner, the Transaction Manager may authorize the cashier to payout the amount of the win. In another embodiment, the player may be able to take the ticket to a kiosk station linked to Transaction Manager to verify the win or loss, and cashout in the case of a win. In yet another embodiment, the player may be able to insert the ticket into the electronic gaming machine's bill validator to verify the win or loss. In this case, the electronic gaming machine may communicate with the Transaction Manager to verify the claim, and if a win, dispense a bar coded voucher that may be claimed like any other cash voucher. In still another variation of this embodiment, the amount of the win may be credited onto the electronic gaming machine on either the primary game or the secondary game.

Further aspects, features and advantages of various embodiments of the disclosed embodiments may be apparent from the following detailed disclosure, taken in conjunction with the accompanying sheets of drawings.

BRIEF DESCRIPTION OF THE DRAWINGS

FIG. 9 is a block diagram using a browser on a regulated gaming device to ensure that the data presented is secure and not tampered with;

DETAILED DESCRIPTION OF THE PREFERRED EMBODIMENTS

Figure 1:
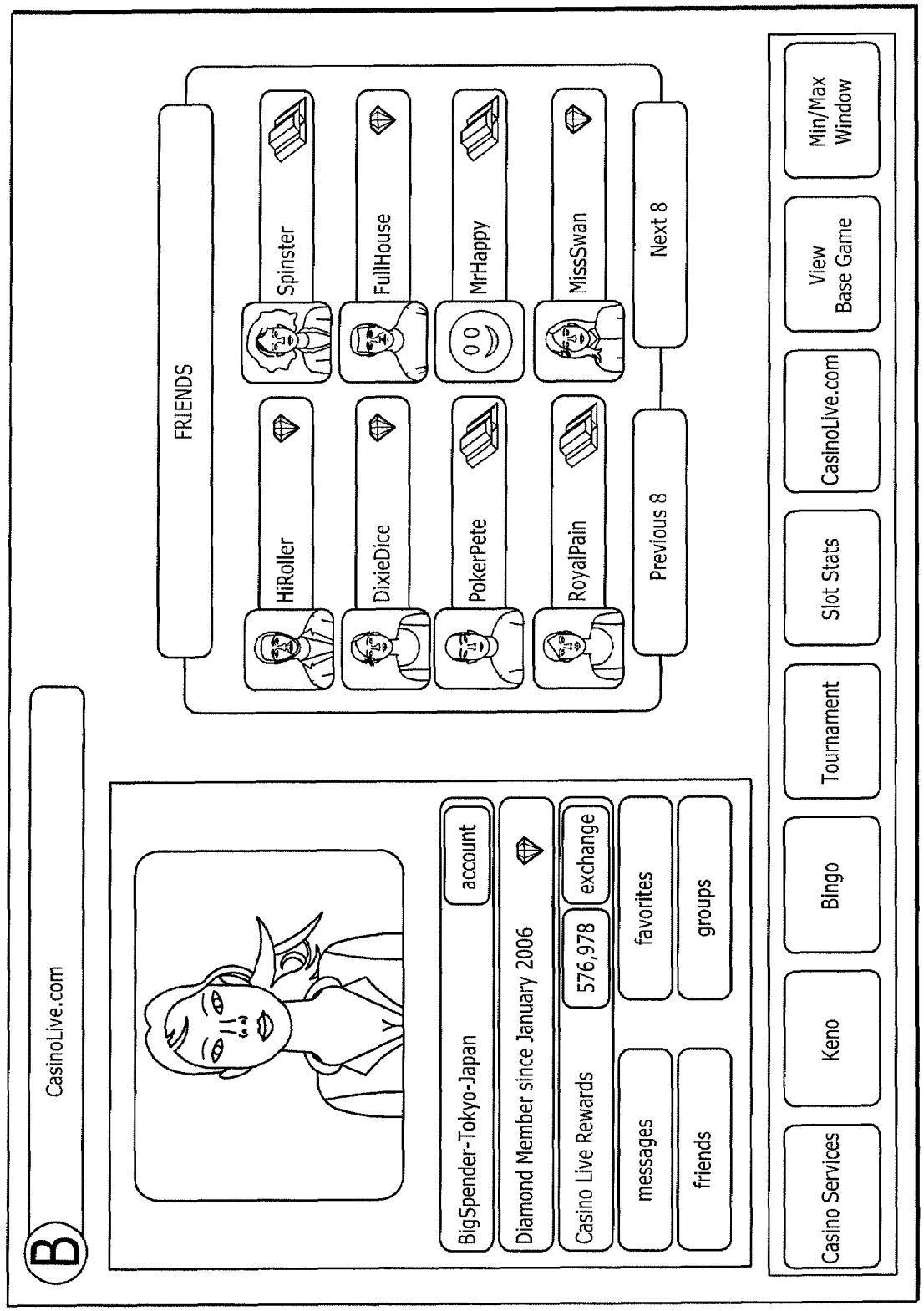
FIG. 1 is a screenshot of the browser client graphic user interface shown to a user on the gaming device, which enables a player to navigate from one browser screen to another using the buttons across the bottom of the screen, as well as view their patron account and/or the base game screen or a combination of both.

FIG. 1 illustrates generic game apparatus displays or electronic gaming machine (EGM) displays suitable for use with the browser manager operating system and method 10. A browser manager server is able to initialize and configure one or more browser windows on a gaming device display screen. The browser manager has the ability to configure specific URLs for each browser window, configure and Z-order depth for each window, set window size and position, and call functions on the browser pages. A browser client side application on a gaming device is capable of creating multiple windows on an electronic gaming device and responding to said server configuration or browser message commands.

Referring now to the drawings, wherein like reference numerals denote like or corresponding parts throughout the drawings and, more particularly to FIG. 1, there is shown one embodiment of a network gaming environment that utilizes browser manager operating systems 10 and methods of the disclosed embodiments. It should be noted that a variety of game architectures can be used to provide game play functions as well as access to other electronic gaming machines and servers through networks, as described below. The particular architecture shown is a generic architecture using components typical to game apparatuses suitable for use with the disclosed embodiments. An electronic gaming machine may take a variety of forms, including a video game apparatus having one or more display screens; a mechanical game having playing pieces and/or other moving mechanical parts; a personal computer system; a "network computer;" a television including or connected to a microprocessor (e.g. a "set top box") for the Internet or other information access, or another apparatus.

As described herein, the electronic gaming machine 80 is used by a player in a "gaming environment." This term is intended to refer to any location, public or private, in which games can be used. For example, public gaming environments include such places as arcades, stores, restaurants, bars, casinos, bowling alleys, stations, hotels, airports, airplanes, cruise ships, gymnasiums, health clubs, or other public places that can offer the electronic gaming machines 120 for use by players and which can provide prizes to players of the game apparatus. A "gaming environment" need not ordinarily provide games to the public. In other embodiments, a "gaming environment" may be a private place, such as a player's home or personal residence, office or other place of employment, private club, and the like.

An electronic gaming machine 80, in accordance with the disclosed embodiments, may include a game processor 120, monetary input device 140, player input device(s) 160, and game output device(s) 180.

Game processor 120 implements (e.g., controls, influences, coordinates, monitors, calculates, and the like) the functions of the electronic gaming machine 80 during a game process and includes several input and output functions. The game processor controls the game apparatus by receiving inputs from a player, from other game apparatuses, from a server (described below), from a progressive bonus apparatus, and from other sources. The game processor also controls output signals to update the game process when appropriate. In addition, the game processor controls the browser manager operating system 10 of the disclosed embodiments by calculating when prizes are awarded, calculating and updating prize lists and prize costs, and other functions, as described below. Game processor 120 preferably includes a digital microprocessor or a similar controller device, and other electronic components. The operation of game processor 120 is described in greater detail below. The game processor is preferably provided within a housing of electronic gaming machine 80.

Monetary input device 140 is used to receive the monetary input that is inserted by a player into the game apparatus in the gaming environment. For example, coins can be received in return for the player's use of the game apparatus. A coin deposit slot can accept standard currency coins, bills, or game tokens that may be available in the gaming environment, and also typically includes a coin return button and coin return slot. Once one or more coins are accepted, the coins are routed to a cash box and a signal is sent to game processor 120 to increase the player's game credits, i.e., to indicate that one or more game plays have been paid. Coin slots and boxes suitable for use in electronic gaming machine 80 are readily available on the commercial market.

Alternatively, other monetary input devices can be used, such as debit card or credit card readers well known to those skilled in the art, or "smart card" readers which can read and write electronic information to and from the card. For example, "E-cash," "cybercash" or other electronic monetary forms can be used. In other embodiments, user verification or validation can be input by the player, such as a player identification and/or password that, for example, allows a monetary value to be billed to a player or deducted from a player's monetary account at a bank or other institution. Herein, the term, "monetary input," is intended to also refer to other types of player validation for use of a game in addition to those forms mentioned above. In alternate embodiments located in non-public gaming environments (e.g., at a user's home), or for other applications, such as promotional uses of electronic gaming machine 80, monetary input may not be necessary for the player to use electronic gaming machine 80.

Input devices 160 are used by a player or user to provide input to the electronic gaming machine 80 to influence game events during a game process and to achieve one or more predetermined goals or tasks for scoring points and winning prizes or other types of awards. The input devices 160 can also be used to select prizes within the browser manager operating system and method 10 of the disclosed embodiments. Alternatively, separate input controls can be used for the prize functions of the electronic gaming machine 80.

Player input typically includes game commands provided by controlling devices 160 such as buttons, a keyboard, dials, joystick controls, a touch screen, a track ball, a mouse, a gun device, a steering wheel, foot pedals, speech input through a microphone, or any other input used in playing a game and providing selections. For example, the player can press a button to tilt a playing surface to guide a playing piece, move a joystick to control a graphical object displayed on a video screen, or toss a playing piece into a target aperture having sensors to detect the present playing piece. Each type of user input can provide a particular game command to the game processor 120, and the game processor interprets the commands and influences game states and game events in the game process accordingly.

Various other types of devices can also be included in electronic gaming machine 80 as input devices 160 to allow the processor 120 to monitor the game. For example, sensors of various types can be employed to detect the paths of playing pieces directed by the player, detect when playing pieces have been dispensed, detect when a game is over, detect cheating actions by the player, and the like. Also, input devices such as buttons, switches, and the like allow the player of the game to make various selections concerning game play. For example, a player could select a one or two player game, a preferred award type, a progressive option, and the like, using additional controls on a front panel of the electronic gaming machine 80.

Game output devices 180 may influence the game and/or provide feedback to the player about the current state of the game process. For example, motors or solenoids can influence mechanical components of the game in response to player commands, such as tilting a playing surface, dispensing a playing piece, spinning a wheel, and the like. Feedback is perceived by the player preferably in the form of visual, auditory, and/or tactile feedback. A video display screen can provide visual feedback such as images to the player during the game process. Other visual output devices can include one or more score displays, lamps or other light sources positioned on or surrounding a "game space" (e.g., a play field or area of game action).

Game output devices such as speakers, buzzers, alarms, and other devices provide auditory feedback, such as sound effects during a game process, synthesized or recorded speech, and the like. Game output devices, such as motors, solenoids, or other actuators can provide forces on the game apparatus or on controls handled by the player to provide tactile feedback in the form of vibration, jolts, and the like. One or more of the game output devices can also be used to display information related to specific prizes that can be won by the player when using the electronic gaming machine 80, as described below. Game output devices 180 can also include a coin return slot for returning coins or tokens or providing other cash prizes after a game is played. Game processor 120 preferably commands such feedback to the player by sending out control signals to the various output devices in electronic gaming machine 80 when appropriate.

G2S (Game to Server) Browser Class

The browser class includes commands and events related to browser activity available on an electronic gaming machine 80. The browser class is a single device class with one owner host, and zero or more guest hosts permitted.

The browser class uses a region of a display device 20 of an electronic gaming machine (EGM). The metrics for the display device 20 (egmDisplayWidth, egmDisplayHeight) are assumed to be relatively stable (infrequent changes); however the display device metrics may be changed if the browser class uses the following sequence: (1) disable the browser class device; (2) delete all browser windows; (3) change the display device metrics; and (4) optionally enable the browser class device.

The region of the display device 20 used by the browser class device is indicated by the browser metrics. This region may change from one context to the next, as specified by the electronic gaming machine 80. For example, the game selection screen may use a specified region, yet a game theme may use a differently sized region.

The browser class device allows browser windows to be set, added, modified, and deleted. Additionally, each browser window can be assigned scripts to execute. Once created, the browser windows can be refreshed, displayed, hidden, resized, or redirected to another web address.

Browser window state changes can be subscribed to by specifying one or more windowStatusSub elements for the specified window. Whenever the browser window transitions to the state, or an error occurs, the browserStatus command is sent to the host as a notification command (no response from the host is needed). The Browser window state changes that are not subscribed to may not be sent to the host.

Most of the browser class commands operate on multiple browser windows by providing a list of windows and related information; however, a single browser may be addressed by providing a list containing one window.

Request-Response Pairs

Figure 1A:
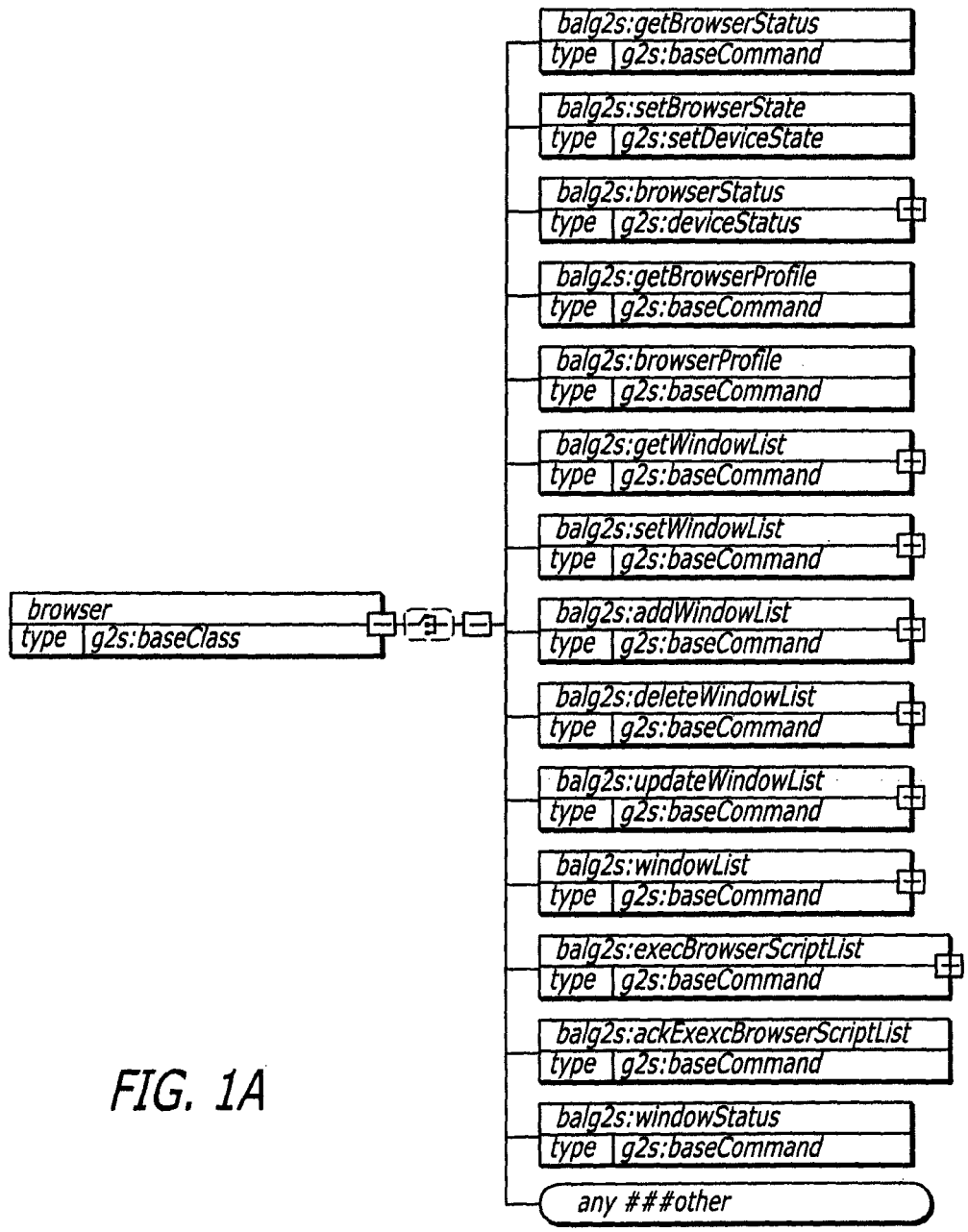
FIG. 1A is a diagram that illustrates the command structure of the browser class.
Figure 2:
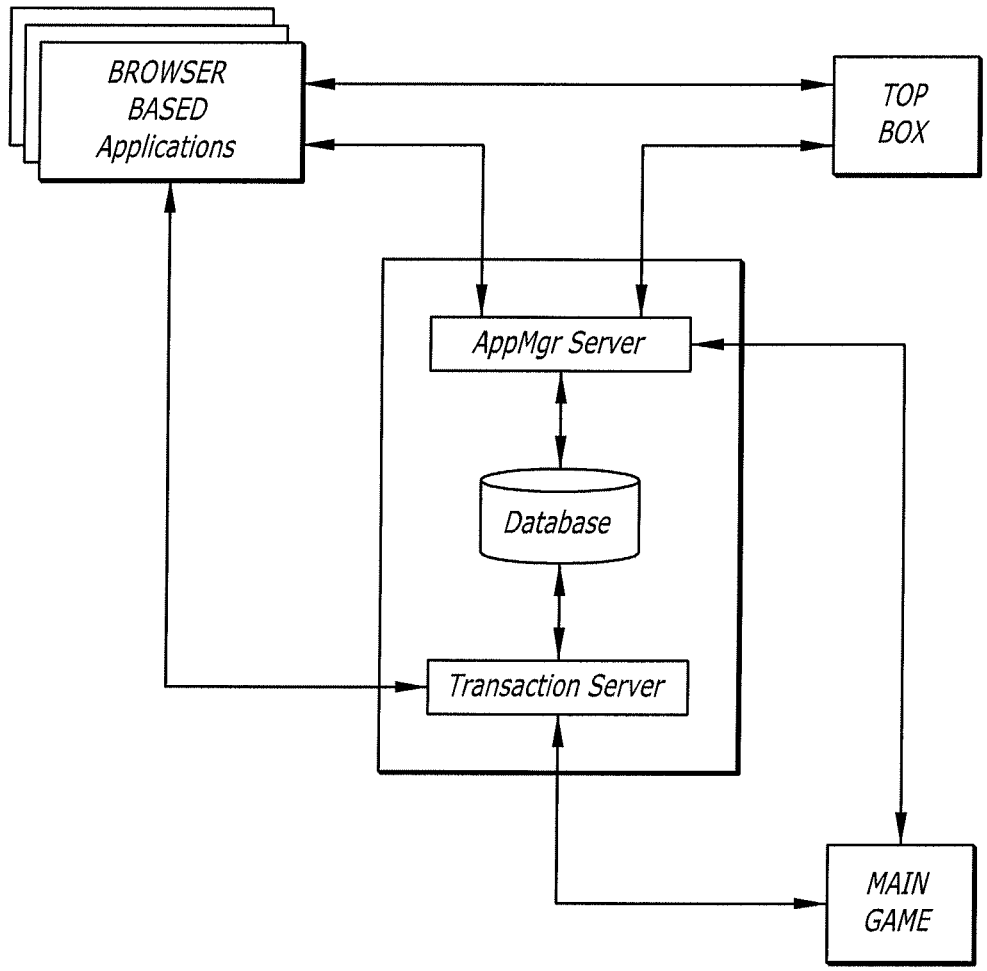
FIG. 2 is a block diagram of the various communication between a main game CPU, a Top Box Monitor, browser-based applications, and middleware application managers/transaction servers that allow the data to flow between all devices.
Figure 3:
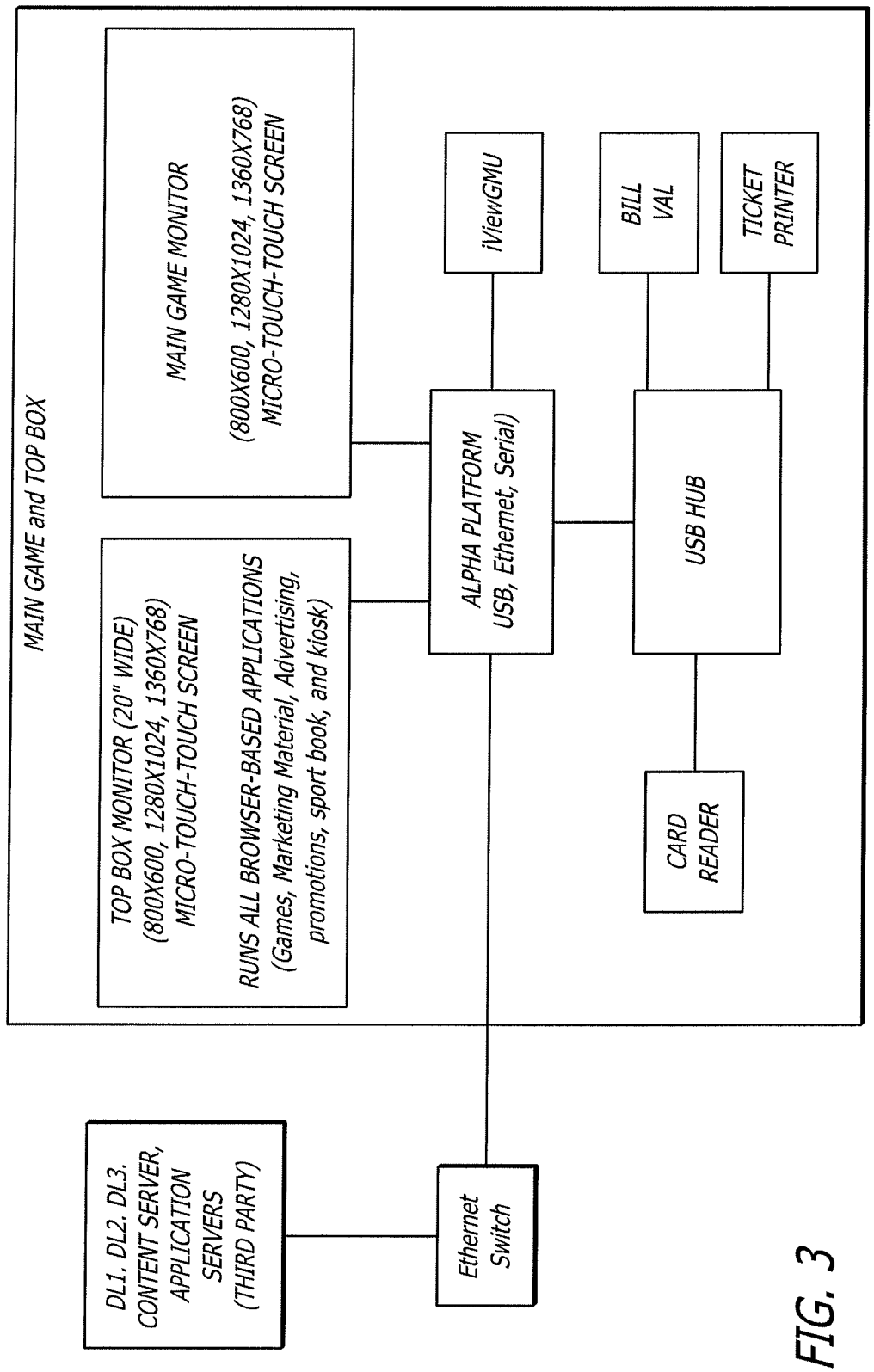
FIG. 3 is a block diagram that displays various components inside the gaming cabinet and how those components interconnect and communicate.

The diagram shown in FIG. 1A highlights the command structure of the browser class.

The following tables organize the commands contained within the browser class into request-response pairs:

TABLE 1

Commands Originiated By electronic gaming machine 80

| Request | Response |
|---|---|
| windowStatus | none |

TABLE 2

Commands Originiated By Host

| Request | Response | Owner | Guest |
|---|---|---|---|
| getBrowserStatus | browserStatus | Yes | Yes |
| setBrowserState | browserStatus | Yes | No |
| getBrowserProfile | browserProfile | Yes | Yes |
| getWindowList | windowList | Yes | Yes |
| setWindowList | windowList | Yes | No |
| addWindowList | windowList | Yes | No |
| deleteWindowList | windowList | Yes | No |
| updateWindowList | windowList | Yes | No |
| execBrowserScriptList | ackExecBrowserScriptList | Yes | No |

The browser class is a single-device class. deviceId 0 is reserved for class level functions.

getBrowserStatus Command

This command is used by a host to request the current status information of the device. The browserStatus command is sent in response to the getBrowserStatus command.

| getBrowserProfile | |
|---|---|
| type | g2s:baseCommand |

The getBrowserStatus element contains no additional attributes or elements.

setBrowserState Command

This command is used by a host to enable or disable the browser device. Disabling the browser device prevents the device from being active or started by an operator. The owner of the device can execute this command. A browserStatus command is sent in response to a setBrowserState command.

TABLE 3 setBrowserState Attributes

| Attribute | Restrictions | Description |
|---|---|---|
| enable | type: boolean<br>use: optional<br>default: true | Indicates whether the browser device is active.<br>true = active and false = inactive. | browserStatus Command

This command is used by an electronic gaming machine 80 to send the current status of the device to a host. The browserStatus command is sent in response to the setBrowserState and getBrowserStatus commands.

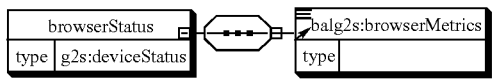

TABLE 4 browserStatus Attributes

| Attribute | Restrictions | Description |
|---|---|---|
| configurationId | type: configurationId<br>use: optional<br>default: 0 | Configuration identifier set by the host. |
| hostEnabled | type: boolean<br>use: optional<br>default: true | Indicates whether the device has been enabled by the host (true/false). |
| egmEnabled | type: boolean<br>use: optional<br>default: true | Indicates whether the device has been enabled by the electronic gaming machine 80 (true/false). |

TABLE 5 browserStatus Elements

| Element | Restrictions | Description |
|---|---|---|
| browserMetrics | minOcc: 1<br>maxOcc: 1 | Contains the attributes that define the browser position and size (metrics). |

TABLE 6 browserMetrics Elements

| Attribute | Restrictions | Description |
|---|---|---|
| coordX | type: int<br>use: required | Horizontal position (in pixels) of the browser's top left corner. |
| coordY | type: int<br>use: required | Vertical position (in pixels) of the browser's top left corner. |
| sizeW | type: int<br>use: required | Width of the browser in pixels. |
| sizeH | type: int<br>use: required | Height of the browser in pixels. | getBrowserProfile Command

This command is used by a host to request the profile information of the device. The browserProfile command is sent in response to the getBrowserProfile command.

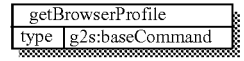

The getBrowserProfile element contains no additional attributes or elements.

browserProfile Command

This command is used by an electronic gaming machine 80 to send the device profile to a host. The browserProfile command is sent in response to the getBrowserProfile command.

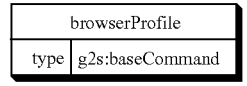

TABLE 7 browserProfile Attributes

| Attribute | Restrictions | Description |
|---|---|---|
| configurationId* | type: configurationId<br>use: required | Configuration identifier set by the host. |
| restartStatus* | type: boolean<br>use: required | Status of the device at restart:<br>true = enabled<br>false = disabled |
| useDefaultConfig* | type: boolean<br>use: required | Indicates whether the default configuration for the device may be used when the electronic gaming machine 80 restarts. |

TABLE 7-continued browserProfile Attributes

| Attribute | Restrictions | Description |
|---|---|---|
| requiredForPlay* | type: boolean<br>use: required | Indicates whether the device is required for play:<br>true = enabled<br>false = disabled<br>If set to true, the device may be installed and operational before the electronic gaming machine 80 can enable itself for play. If the device is not installed or operational, the egmEnabled attribute should be set to false. |
| egmDisplayWidth* | type: int<br>use: required | Width of the electronic gaming machine 80 display in pixels. |
| egmDisplayHeight* | type: int<br>use: required | Height of the electronic gaming machine 80 display in pixels. |

*Standard configuration option that may be included in the standard option configuration group - 3 BAL_browserOptions - for a browser class device.

getWindowList Command

This command is used by a host to read the set of browser windows in the browser device. The windowList command is sent in response to the getWindowList command.

The command can request that all browser windows be returned in the response by omitting the windowSelect element, which has the effect of a wildcard for all browser windows. Alternatively, the command can request that one or more specific browser windows be returned in the response by specifying the specific sesWindowId's in a list of windowSelect elements.

Possible error codes are:

BAL_BRX001: Command references an unknown sesWindowId.

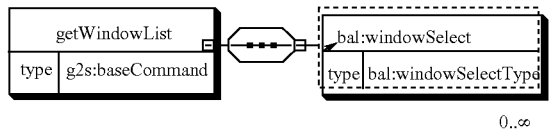

TABLE 8 getWindowList Elements

| Element | Restrictions | Description |
|---|---|---|
| windowSelect | minOcc: 0<br>maxOcc: ☐ | Contains a list of window specifications to return to the host. NOTE: omission of this element specifies that all windows should be in the response. |

TABLE 9 windowSelect Attributes

| Attribute | Restrictions | Description |
|---|---|---|
| sesWindowId | type: sesWindowId<br>use: required | Unique browser window identifier. | setWindowList Command

This command is used by a host to assign the set of browser windows in the browser device. The windowList command is sent in response to the setWindowList command. When processed, this command may replace all previously assigned browser windows with the browser windows specified in this command.

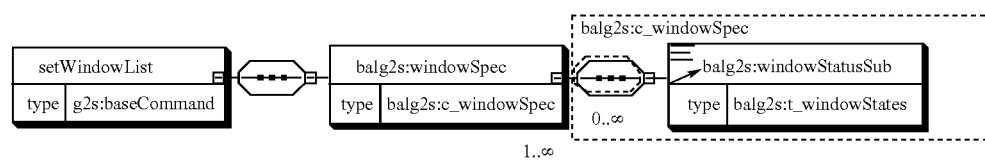

TABLE 10 setWindowList Elements

| Element | Restrictions | Description |
|---|---|---|
| windowSpec | minOcc: 1<br>maxOcc: ☐ | Contains a list of window specifications to assign to the browser. |

TABLE 11 windowSpec Attributes

| Attribute | Restrictions | Description |
| --- | --- | --- |
| sesWindowId | type: sesWindowId<br>use: required | Unique browser window identifier. |
| coordX | type: int<br>use: required | Horizontal position (in pixels) of the window's top left corner. |
| coordY | type: int<br>use: required | Vertical position (in pixels) of the window's top left corner. |
| coordZ | type: int<br>use: required | Z-order (front to back) of the window. |
| sizeW | type: int<br>use: required | Width of the window in pixels. |
| sizeH | type: int<br>use: required | Height of the window in pixels. |
| visible | type: boolean<br>use: required | Indicates if the window is visible. |
| url | type: transportLocation<br>use: required | A Universal Resource Locator (URL) addressing the content for the window to display. |

TABLE 12 windowSpec Elements

| Element | Restrictions | Description |
| --- | --- | --- |
| windowStatusSub | type: windowStates<br>minOcc: 0<br>maxOcc: ☐ | Identifies a windows state that may be sent to the host via the windowStatus command. Note: This is an optional element of type windowStates, and has no attributes. | addWindowList Command

This command is used by a host to add browser windows to the existing set of browser windows in the device. The windowList command is sent in response to the addWindowList command. When processed, this command may append the newly added windows to the windowList.

Possible error codes are:

BAL_BRX002: Command references an existing sesWindowId.

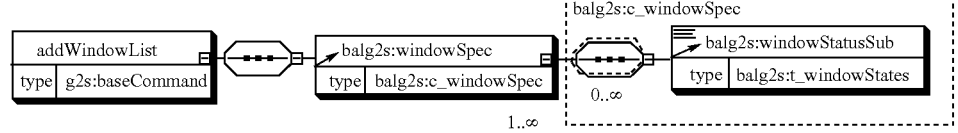

TABLE 13 addWindowList Elements

| Element | Restrictions | Description |
| --- | --- | --- |
| windowSpec | minOcc: 1<br>maxOcc: ☐ | Contains a list of window specifications to add to the browser. |

NOTE: the windowSpec element attributes are defined in Table 11.

delete WindowList Command

This command is used by a host to remove a set of browser windows from the browser device. The windowList command is sent in response to the deleteWindowList command.

Possible error codes are:

BAL_BRX001: Command references an unknown sesWindowId.

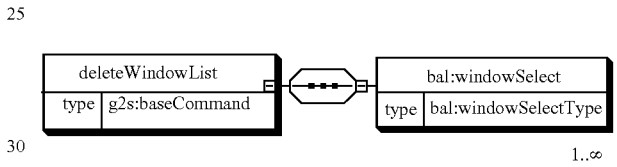

TABLE 14 deleteWindowList Elements

| Element | Restrictions | Description |
| --- | --- | --- |
| windowSelect | minOcc: 0<br>maxOcc: ☐ | Contains a list of window specifications to return to the host. NOTE: omission of this element specifies that all windows should be in the response. |

NOTE: the windowSelect element attributes are defined in Table 9.

updateWindowList Command

This command is used by a host to update the set of browser windows in the browser device. The windowList command is sent in response to the updateWindowList command. When processed, this command may update the attributes specified while retaining values for attributes that are omitted from the command.

Possible error codes are:

BAL_BRX001: Command references an unknown sesWindowId.

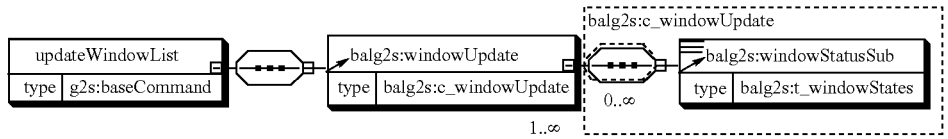

TABLE 15 updateWindowList Elements

| Element | Restrictions | Description |
|---|---|---|
| windowUpdate | minOcc: 1<br>maxOcc: ☐ | Contains a list of windows to update within the browser. |

TABLE 16 windowUpdate Attributes

| Attribute | Restrictions | Description |
|---|---|---|
| sesWindowId | type: sesWindowId<br>use: required | Unique browser window identifier. |
| coordX | type: int<br>use: optional | Horizontal position (in pixels) of the window's top left corner. |
| coordY | type: int<br>use: optional | Vertical position (in pixels) of the window's top left corner. |
| coordZ | type: int<br>use: optional | Z-order (front to back) of the window. |
| sizeW | type: int<br>use: optional | Width of the window in pixels. |
| sizeH | type: int<br>use: optional | Height of the window in pixels. |
| visible | type: boolean<br>use: optional | Indicates if the window is visible. |
| url | type: transportLocation<br>use: optional | A Universal Resource Locator (URL) addressing the content for the window to display. |

TABLE 17 windowUpdate Elements

| Element | Restrictions | Description |
|---|---|---|
| windowStatusSub | type: windowStates<br>minOcc: 0<br>maxOcc: ☐ | Identifies a windows state that may be sent to the host via the windowStatus command. Note: This is an optional element of type windowStates and has no attributes. | windowList Command

This command is used by the electronic gaming machine 80 to send the current set of browser windows to a host. The windowList command is sent in response to the getWindowList, setWindowList, addWindowList, deleteWindowList, and updateWindowList commands.

When the windowList command is sent in response to the getWindowList command, the contents of the windowList may match the specified browser windows from the getWindowList request. In all other cases, all of the browser windows may be present in the windowList response.

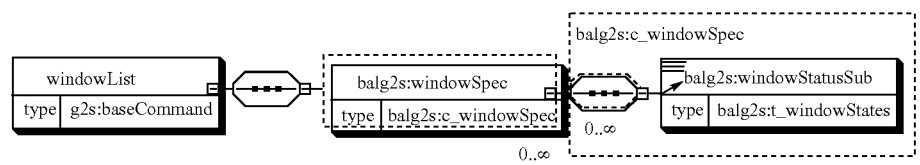

TABLE 18 windowList Elements

| Element | Restrictions | Description |
|---|---|---|
| windowSpec | minOcc: 1<br>maxOcc: ☐ | Contains a list of current window specifications within the browser. |

NOTE:
the windowSpec element attributes are defined in Table 11.

execBrowserScriptList Command

This command is sent by a host to execute scripts in the context of the browser windows within the device. The ackExecBrowserScriptList command is sent in response to the execBrowserScriptList command.

Possible error codes are:

BAL_BRX001: Command references an unknown sesWindowId.

BAL_BRX001: Command references an unknown script function or script type.

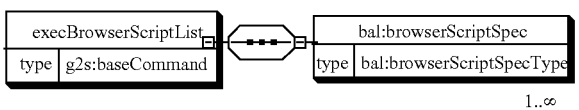

TABLE 19 execBrowserScriptList Elements

| Element | Restrictions | Description |
|---|---|---|
| browserScriptSpec | minOcc: 1<br>maxOcc: ☐ | Contains a list of window identifiers with associated scripts to execute. |

TABLE 20 browserScriptSpec Attributes

| Attribute | Restrictions | Description |
|---|---|---|
| sesWindowId | type: sesWindowId<br>use: required | Unique browser window identifier. |

TABLE 20-continued browserScriptSpec Attributes

| Attribute | Restrictions | Description |
|---|---|---|
| scriptType | type: browserScriptType<br>use: required | Identifies the type of script referenced by the 'function' attribute. |
| function | type: string<br>use: required | Identifies a script to execute in the context of the browser window. | ackExecBrowserScriptList Command

This command is used by electronic gaming machine 80 to send the host an application level acknowledgement that the execBrowserScriptList command was processed. The ackExecBrowserScriptList command is sent in response to the execBrowserScriptList command.

The acknowledgement does NOT imply that the scripts have been executed; it indicates that the scripts have been queued up for execution.

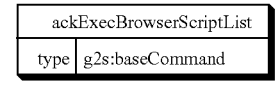

The ackExecBrowserScriptList element contains no additional attributes or elements.

windowStatus Command

This command is sent by electronic gaming machine 80 to notify the host that a browser window has changed state. The purpose of this command is to notify the host when a page has started, or has finished loading its content, and the like. The windowStatus command is a notification command, thus has no response from the host.

The windowStatus command is sent when there are window status subscriptions that correspond to the windowState, or an error occurs in the browser window.

| windowStatus | |
|---|---|
| type | g2s:baseCommand |

TABLE 21 windowStatus Attributes

| Attribute | Restrictions | Description |
|---|---|---|
| sesWindowId | type: sesWindowId<br>use: required | Unique browser window identifier. |
| windowStatus | type: windowStates<br>use: required | Identifies the state of the browser window. |
| url | type: transportLocation<br>use: optional<br>default: <empty> | An optional Universal Resource Locator (URL) addressing the content for the window to display. |
| httpStatusCode | type: egmMessage<br>use: optional<br>default: <empty> | Contains an optional HTTP status code. |
| errorText | type: egmMessage<br>use: optional<br>default: <empty> | Contains an optional text description of the browser window error. Note: used when there is a non-empty value in the errorCode attribute. |

Data Types

The following table lists the data types specific to the browser class:

TABLE 22 browser Class Data Types

| Data Type | Restrictions | Description |
| --- | --- | --- |
| sesWindowId | type: int<br>mimIncl: 1 | A unique window identifier. |
| browserScriptType | type: string | An identification of the script type. |
| windowStates | type: string<br>enum: see Table 23 | Window states that are subscribed to by the host, and notified with a windowStatus command. |

TABLE 23 windowStates enumerations

| Enumeration | Description |
| --- | --- |
| BAL_none | No window states are subscribed. |
| BAL_anyError | An error has occurred in the browser window. |
| BAL_openUri | Window is opening a URI. |
| BAL_pageStarted | Page start state is reported. |
| BAL_pageFinished | Page finished state is reported. |

Error Codes

The following table lists the error codes specific to the browser class:

TABLE 24 browser Class Error Codes

| Error Code | Standard Error Text |
| --- | --- |
| BAL_BRX001 | Command references an unknown sesWindowId. |
| BAL_BRX002 | Command references an existent sesWindowId. |
| BAL_BRX003 | Command references an unknown script function or script type. |
| BAL_BRX004 | Command contains invalid window position or size. |
| BAL_BRX005 | Command contains an invalid window status subscription. |

Event Codes

The following table lists the event codes specific to the browser class:

TABLE 25 browser Class Event Codes

| Event Code | CB | BR |
| --- | --- | --- |
| BAL_BRE001 electronic gaming machine Disabled Browser Device | | S |
| BAL_BRE002 electronic gaming machine Enabled Browser Device | | S |
| BAL_BRE003 Host Disabled Browser Device | | S |
| BAL_BRE004 Host Enabled Browser Device | | S |
| BAL_BRE005 Host Changed Browser Config | | S |
| BAL_BRE006 electronic gaming machine Changed Browser Config | | S |
| BAL_BRE101 Browser Metrics Changed | | S | evaluate(state)

The egmEnabled and egmState attributes are both determined from multiple factors.

If all of the faults for a device have been cleared then the egmEnabled attribute for the device can be set to true. If any one fault still exists then the egmEnabled attribute may be set to false. Thus, after a fault is cleared, the electronic gaming machine (egm) may evaluate all of the attributes that contribute to the state of the egmEnabled attribute. If anyone of them shows a fault then the egmEnabled attribute may remain false. This is communicated in the following documentation by using the convention "evaluate(device.egmEnabled)".

Likewise, the egmState attribute of the cabinetStatus reflects the aggregate state of all devices in the electronic gaming machine 80. If the requiredForPlay attribute in the profile of a device is set to true then if either the egmEnabled or hostEnabled attribute of the device is set to false, the egmState may reflect that the electronic gaming machine 80 is disabled. Similarly, if the egmLocked or hostLocked attribute of a device is set to true then the egmState may reflect that the electronic gaming machine 80 is locked out. If any one device is in such a state then the egmState may reflect that the electronic gaming machine 80 is disabled or locked out, as appropriate. Thus, after a device has been enabled or a lockout has been cleared, the electronic gaming machine 80 may evaluate the state of all active devices within the electronic gaming machine 80 to determine the proper value of the egmState attribute. At the same time, the deviceClass and deviceId attributes of the cabinetStatus may be updated to reflect the appropriate device. This is communicated in the following documentation by using the convention "evaluate(cabinet.egmState)".

BAL_BRE001 Electronic Gaming Machine Disabled Browser Device

This event is sent by the electronic gaming machine 80 after the browser device has been disabled at the electronic gaming machine.

TABLE 26

BAL_BRE001 Device State, Meter, Log Changes and Related Commands

| | Details |
| --- | --- |
| Device State Changes | browser.egmEnable = "false"<br>evaluate(cabinet.egmState) |
| Meter State Changes | None. |
| Log State Changes | None. |
| Related Commands | None. |

BAL_BRE002 Electronic Gaming Machine Enabled Browser Device

This event is sent by the electronic gaming machine 80 after the browser device has been enabled at the electronic gaming machine 80.

TABLE 27

BAL_BRE002 Device State, Meter, Log Changes and Related Commands

| | Details |
| --- | --- |
| Device State Changes | browser.egmEnable = "true"<br>evaluate(cabinet.egmState) |
| Meter State Changes | None. |
| Log State Changes | None. |
| Related Commands | None. |

BAL_BRE003 Host Disabled Browser Device

This event is sent by the electronic gaming machine 80 after the browser device has been disabled by a setBrowserState command issued by a host.

TABLE 28

| BAL_BRE003 Device State, Meter, Log Changes and Related Commands | |
|---|---|
| | Details |
| Device State Changes | browser.hostEnable = "false" evaluate(cabinet.egmState) |
| Meter State Changes | None. |
| Log State Changes | None. |
| Related Commands | None. |

BAL_BRE004 Host Enabled Browser Device

This event is sent by the electronic gaming machine 80 after the browser device has been enabled by a setBrowserState command issued by a host.

TABLE 29

| BAL_BRE004 Device State, Meter, Log Changes and Related Commands | |
|---|---|
| | Details |
| Device State Changes | browser.egmEnable = "true" evaluate(cabinet.egmState) |
| Meter State Changes | None. |
| Log State Changes | None. |
| Related Commands | None. |

BAL_BRE005 Host Changed Browser Config

This event is sent by the electronic gaming machine 80 after the configuration options for the browser device have been changed remotely by a host. The event may be sent after the "configuration changes applied" event is sent by the configuration device.

TABLE 30

| BAL_BRE005 Device State, Meter, Log Changes and Related Commands | |
|---|---|
| | Details |
| Device State Changes | None. |
| Meter State Changes | None. |
| Log State Changes | None. |
| Related Commands | None. |

BAL_BRE006 electronic gaming machine Changed Browser Config

This event is sent by the electronic gaming machine 80 after the configuration options for the browser device have been changed locally at the electronic gaming machine 80. The event may be sent until the operator commits the configuration changes.

TABLE 31

| BAL_BRE006 Device State, Meter, Log Changes and Related Commands | |
|---|---|
| | Details |
| Device State Changes | None. |
| Meter State Changes | None. |
| Log State Changes | None. |
| Related Commands | None. |

BAL_BRE101 Browser Metrics Changed

This event is sent by the electronic gaming machine 80 after the browser metrics have changed. This event provides a means for a host to be notified of the browser metrics change and to subscribe to the event with the device status data, which may provide the new browser metrics values.

TABLE 32

| BAL_BRE101 Device State, Meter, Log Changes and Related Commands | |
|---|---|
| | Details |
| Device State Changes | The browserStatus.browserMetrics element attributes for coordX, coordY, sizeW, and sizeH may be updated to the new values. |
| Meter State Changes | None. |
| Log State Changes | None. |
| Related Commands | None. |

Figure 5:
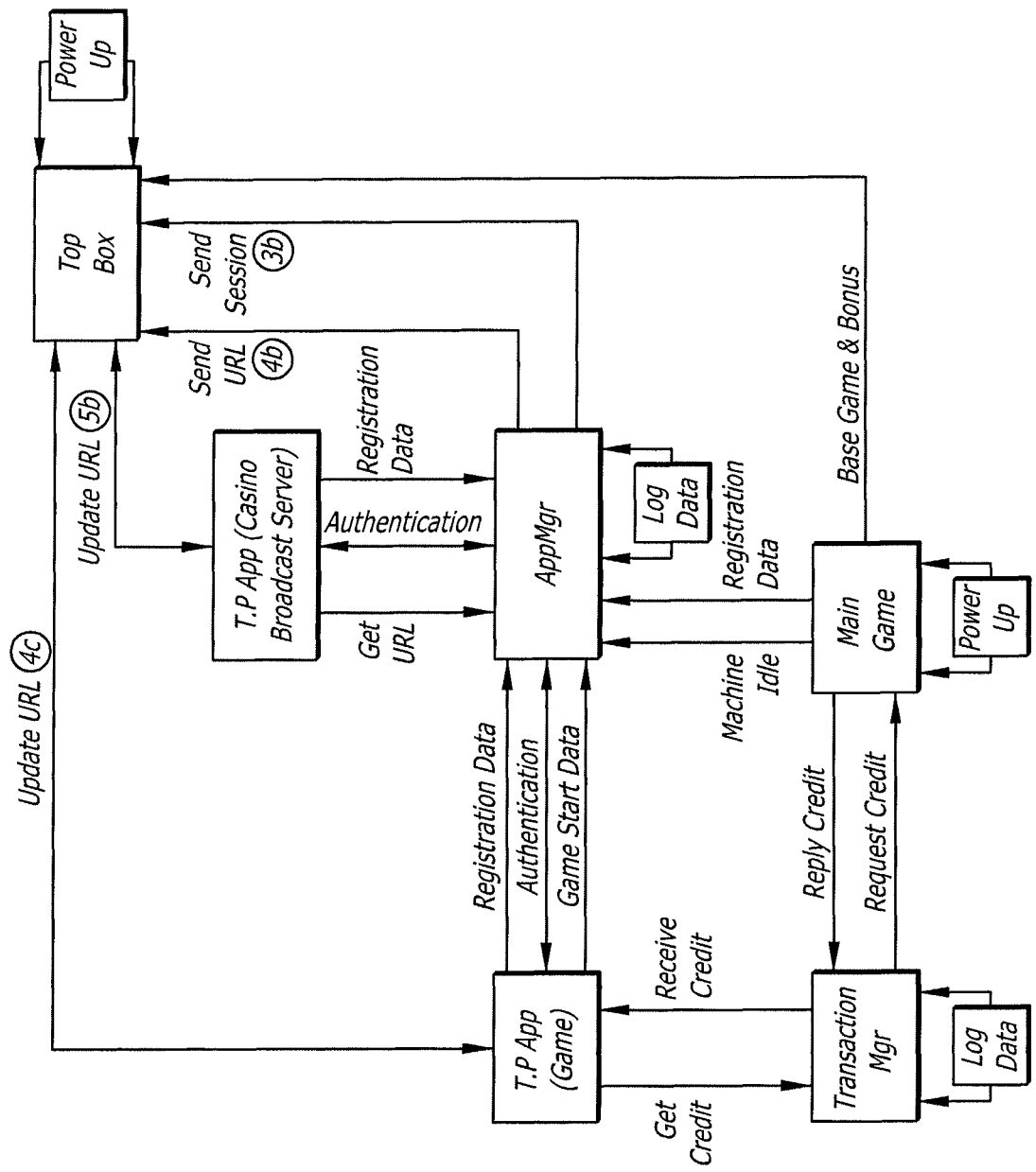
FIG. 5 is a logical flow diagram that displays communication between all clients and servers using the browser manager and browser client software and protocol.

Referring now to FIG. 5, in sequence 1A and 2A, when the main game on the electronic gaming machine 80 powers up, it registers with browser manager 100 by sending specific information such as the game IP address, the screen resolution and available browser space. The browser manager 100 then logs the information in a database table.

With respect to the type of applications, a distinction is made between browser content that is static or dynamic. Static content is handled by a (or $3^{rd}$ party) Broadcast Server (as labeled in the diagram) and normally does not necessitate player input and does not involve money transactions. The static content is normally informational but may include static pay tables. On the other hand, dynamic content refers to playable applications (games) that are transmitted to the secondary display and involve player input and wagering. This is labeled T.P. Application (game) in the diagram.

Referring now to sequence 1b, 2b, 3b, 4b, and 5b (static content), on startup, the application (Bingo, Keno, and the like) registers with Browser Manager 100 by sending specific information such as the application parameters (number of windows needed, window coordinates, and Z order). The Browser Manager 100 then logs the information in a database table. An authentication process may follow to make sure the application source is secure. The Browser Manager 100 notifies the electronic gaming machine 80 top box (secondary display) by sending it session data including window coordinates and application URL.

Referring now to sequence 1c, 2c, 3c, 4c, 5c, 6c, 7c, 8,c 9c, and 10c (dynamic content), the same registration and authentication process occurs. In this case, there is an application server providing the game content and allowing the player to place wagers and receiving credit. All transactions are logged by the transaction server. The transaction server acts as an intermediary between the application server and the electronic gaming machine/Player.

In one embodiment of the browser manager operating system 10, the design of the browser on the electronic gaming machine incorporates additional technology components, such as adding and using the Mozilla browser in the Alpha OS. In some embodiments, Macromedia Flash support can be added through a plug-in.

With respect to browser configuration, using a config text file (/games/video.cfg), the games can specify whether they want to enable a browser region and specify the region in pixels. This file is also used by games using the OpenGL video server (glvideo).

```
# OpenGL = Supported, Required, Unsupported
OpenGL = Unsupported
# Screen0    640x480 Single Screen
# Screen1    800x600 Single Screen
# Screen2    1024x768 Single Screen
# Screen3    1280x1024 Single Screen
# Screen4    1600x1200 Single Screen
# Screen5    640x480 Dual Screen
# Screen6    800x600 Dual Screen
# Screen7    1024x768 Dual Screen
# Screen8    1280x1024 Dual Screen
# Screen9    1600x1200 Dual Screen
Screen = Screen6
# used to instruct glvideo to start in dualscreen mode
# game has to be written for both screens
DualScreen = yes
# Browser variables. Whether enabled, and dimensions in pixels
Browser = Enabled
BrowserX = 0
BrowserY = 0
BrowserW = 800
BrowserH = 600
#Video Y, in dual screen specifies video's Y offset from the top
VideoY = 600
```

Browser Server on Electronic Gaming Machine

An IPC server ("BrowserSvr") may be added to the OS that may have the capability to launch multiple browser windows and perform various operations on them; such as positioning, sizing each of them, opening URLs in those windows, and closing any of them. This server may link to the Mozilla libraries in the sandbox.

libbrowser:

The libbrowser (gameapi/libraries/libbrowser) library contains the interface for clients to communicate with the browser server.

A client application wishing to interface with the browser server may include the following header file:

gameapi.xx.xx\libraries\libbrowser\BrowserAPI.h

This header may contain functions to communicate with the server. For example, it can ask the browser server to open a new browser window and return the handle to that browser window. The handle returned is used to identify the browser window in other calls that perform a specific operation on that window.

There are two types of browser windows currently defined: Normal and Modal. The default type is Normal. A Modal window is used when a message is to be displayed that prevents the user from interacting with any other Browser windows. Creation of a modal browser window is almost the same as the creation of a normal window, except for the window type. Being that the modal window is a regular browser window, the content inside a modal browser window is completely server-controllable. Any other browser windows may not receive user input until the modal window is closed.

The Browser API may also allow clients to register callbacks for error conditions and prompts encountered while reading content on pages.

Header Definitions:

```
#define BROWSER_SERVER_NAME        "sdg.browser.1"
    namespace BrowserAPI
{
    void Init (const char * clientName = NULL);
    void Kill ( );
    /** Open a new browser window */
    void NewBrowserWindow(int x, int y, unsigned int w, unsigned int h,
    HBROWS& hWin, int type=WND_NORMAL,int z=0,
    const char *uri=0);
    /** Set attributes of browser window */
    void SetBrowserWndAttribs(HBROWS hWin, int x, int y,
    unsigned int w, unsigned int h,int z, const char *uri);
    /** Set z-order of browser window */
    void SetBrowserWinZOrder(HBROWS hWin, int z);
    /** Load a URI in the browser window */
    void SetBrowserURI(HBROWS hWin, const char *uri);
    /** Set the browser window position & size */
    void MoveBrowser(HBROWS hWin, int x,
    int y,unsigned int w,unsigned int h);
    /** Set the visibility of the window */
    void ShowBrowser(HBROWS hWin, bool bShow);
    /** Close the window */
    void CloseBrowser(HBROWS hWin);
    /*Execute script function on page. */
    void ExecJavascriptFn(HBROWS hWin, const char *jsuri);
    /** Get the browser window XID*/
    void GetBrowserWindowXID(HBROWS hWin, unsigned long& xid);
    /** Register for browser errors e.g. Http errors*/
    typedef void (*MozErrorCB)(HBROWS hWin,const char *uri,
    int errCode);
    void RegisterMozErrors (MozErrorCB yourFunction);
}
```

Messages used by the library to communicate with the server:

```
gameapi.xx.xx\libraries\libbrowser\BrowserMsgs.h
    enum
{
    cmdNewBrowserWin        = 0x0001,
    cmdCloseBrowserWin      = 0x0002,
    cmdSetBrowserURI        = 0x0003,
    cmdSetBrowserPosSize    = 0x0004,
    cmdBrowserShow          = 0x0005,
    cmdSetName              = 0x0007,
    cmdSetWndAttribs        = 0x0009,
    cmdURIError             = 0x000A,
    cmdSetBrowserZOrder     = 0x000C,
    cmdExecjscript          = 0x000E,
    cmdGetBrowserWinXID     = 0x000B,
    cmdRegMozErrors         = 0x0011,
};
```

Usage Examples:

```
#include "BrowserAPI.h"
BrowserAPI::Init("browsclient");
HBROWS hWin = 0, hWin2=0;
BrowserAPI::NewBrowserWindow(20,20,600,400,hWin,
WND_NORMAL,10,"mozilla.org";
BrowserAPI::ShowBrowser(hWin,true);
......
//move first window
BrowserAPI::MoveBrowser(hWin,200,40,500,200);
//open second window
BrowserAPI::NewBrowserWindow(50,300,400,100,hWin2,
WND_NORMAL,50,"gnu.org");
BrowserAPI::ShowBrowser(hWin2,true);
On some event, change Browser 2's URL
BrowserAPI::SetBrowserURI(hWin2, "somesite.com");
//execute a script function called StartFlash( ) on second Browser window.
BrowserAPI::ExecJavascriptFn(hWin2, "StartFlash(5)" );
//close the first browser window
BrowserAPI::CloseBrowser(hWin);
```

Figure 4:
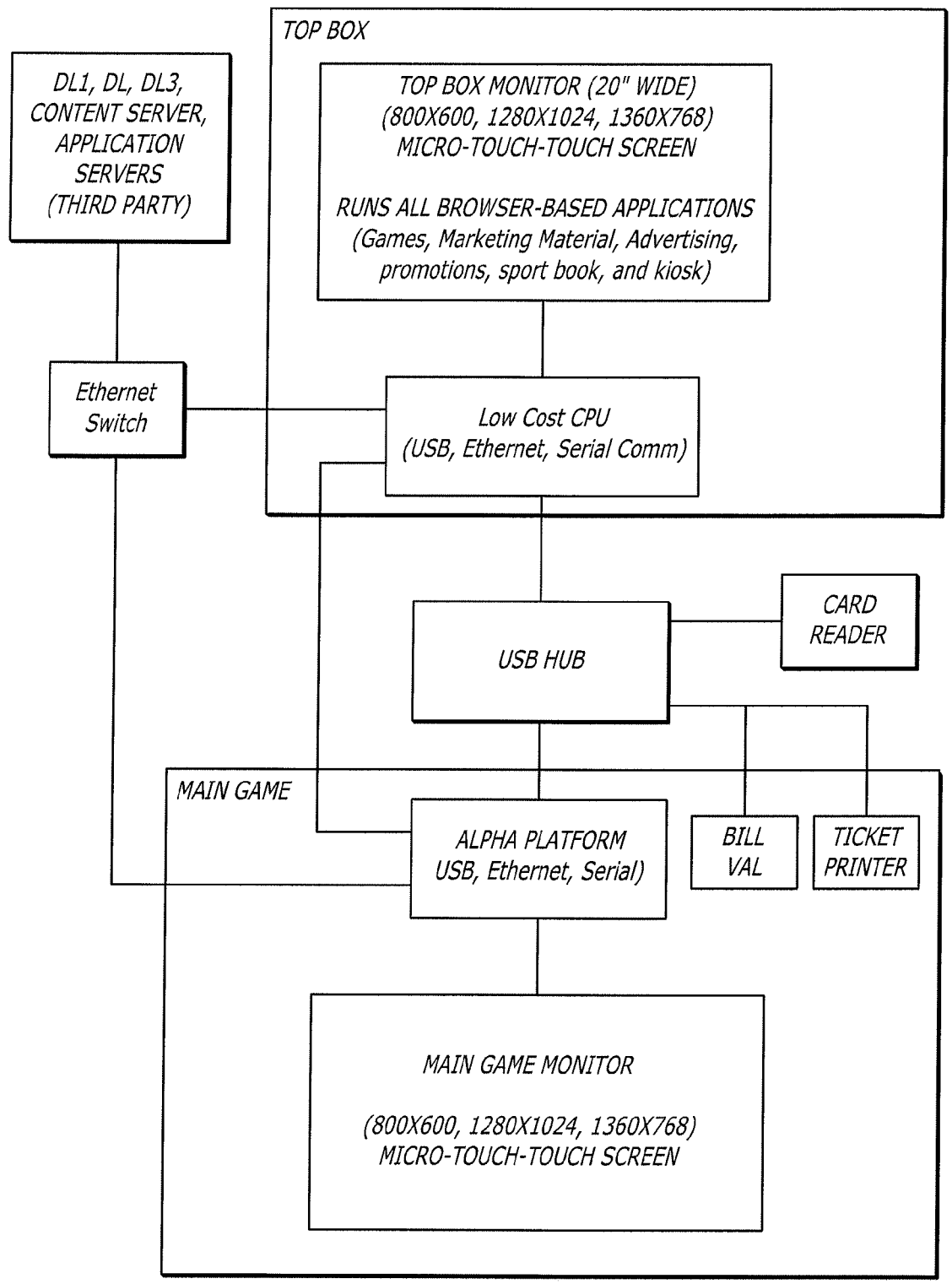
FIG. 4 is a block and logical flow diagram that displays various components inside a gaming machine and those components interconnect and communicate to each other and the servers.

Referring to FIG. 4 and FIG. 5, touch events are described. The OS reads the events for the primary monitor via the serial port. The Browser is expected to run on a secondary/top monitor, which may have a USB controller plugged into a USB port on the h/w. A USB touch server may be added to the OS that may read the touch events through the USB port and convey them to the BrowserSvr. The BrowserSvr may forward the events to the Mozilla libraries. An extension has been written to the Mozilla embedding library that may convert the touch event to a mouse event and send it to the appropriate browser window In one embodiment of the browser manager operating system 10 true type font are utilized. In one specific, non-limiting example, using Mozilla's XFT capability, smooth (anti-alias) true type fonts can be displayed. Adding of true type fonts to the OS Flash requires investigation into their licensing, since many True Type fonts are not freely redistributable. We can include the Bitstream Vera fonts on the OS Flash(/usr/share/fonts/bitstream-vera) since they are free fonts and can be freely redistributed with any commercial software product.

During system boot up, detection of how many monitors are present is required. The starting of X windows will depend on this. G2S browser support classes that will communicate with G2S host(s) and with the BrowserSvr. Base G2S support is required as the transport medium and device registration for the browser class. Flash animations do not receive browser events. A flash to javascript bridge API would be used to send data from the OS into the flash content. The Browser window opacity will be supported. This allows visibility through one or more windows to ones behind the others.

Browser Application System

In one embodiment of the browser manager operating system 10, a browser application system presents design considerations for Browser Manager 100. The Browser Manager 100 may control the Browser layouts and panels presented to the player in Browser windows on the Player Terminal (electronic gaming machine 80). The technologies used for testing are Open Source, cross-platform.

Web Server: Apache

In another aspect of one embodiment, a Web page Scripting language with database connectivity is utilized; PHP (alternatives being ASP[Microsoft], JSP[Sun], and the like).

Database: MySQL or Microsoft SQL Server 2005

Browser Manager

Figure 5A:
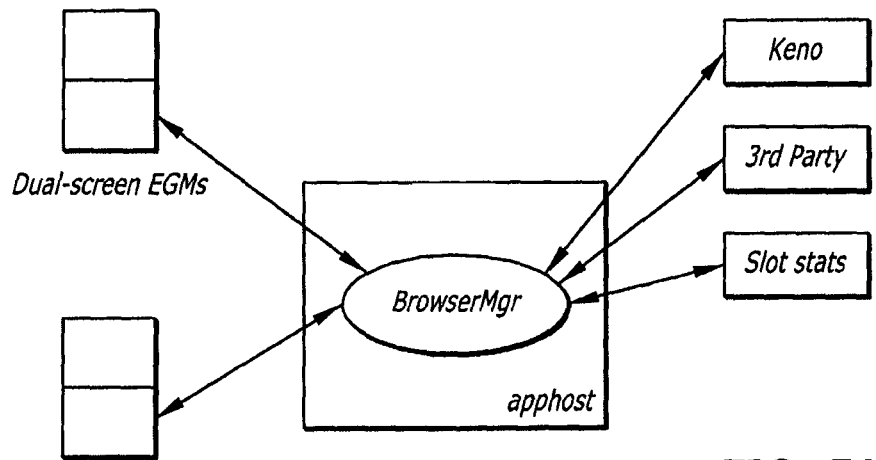
FIG. 5A illustrates a Browser Manager in communication with additional servers and with the Player Terminals on the floor.

The Browser Manager 100 is an application that sits on a host server, communicates with app/game/$3^{rd}$ party servers and with the Player Terminals on the floor. The Browser Manager 100 runs on a server 'apphost,' as shown in FIG. 5A.

If apphost/Browser Manager 100 is down, no Browser-based services may be available. Alternatively, it has a backup/redundancy system that may kick in when apphost goes down. The splash screen residing on the OS flash may be used when Browser Manager 100 is unavailable.

The apphost can keep a list of the application servers in a table 'tblApps'. Adding an application server for the first time could be done by the sysadmin manually adding the record into the table (or through a flat file that could be then loaded into the table). During the addition process, the application/game servers would provide an Offline page that may reside on the apphost, which Browser Manager 100 can use in the event the application/game host goes offline.

The information in the tblApps table may be periodically updated by the individual application/game servers by communicating with the Browser Manager 100. For example, if the Keno server wanted to change the icon image or text representing it in the panel, it would send down the request to the Browser Manager 100 with an updated icon URL and text, and the Browser Manager 100 would update the record in the table.

The application/game servers and Player Terminals would send a Heartbeat message regularly to the Browser Manager 100 to let it know they are online and ready. The Browser Manager 100 would update its tables with online/offline statuses accordingly. The Browser Manager 100 may be implemented as a Windows application, or cross-platform[Java] with database connectivity.

Location of Applications

TABLE: tblApps

Database: appsdb.

| App ID | App Name | Description | App Host | IconURL | Offline IconImg | IconTxt | AppURL | Offline Page | Online |
|---|---|---|---|---|---|---|---|---|---|
| 0 | Casino Services | Services offered by resort | svcshost: 3200 | svcshost:// img/services.gif | apphost:/ Services_offline.gif | Casino Services | svcshost:// services.html | apphost:/ Services_offline.html | Y |
| 1 | Keno | Browser based Keno | Kenohost: 3200 | kenohost:// img/kenoicon.gif | apphost:/ keno_offline.gif | Play Keno | kenohost:// keno.php | apphost:/ keno_offline.html | Y |
| 2 | Bingo | Browser based Bingo | Bingohost: 3300 | bingohost:// img/bingoicon.gif | apphost:/ bingo_offline.gif | Play Bingo | Bingohost:// bingo.cgi | apphost:/ bingo_offline.html | Y |
| 3 | Tournament | | Tnmthost: 3310 | tnmthost:// img/tournament.gif | apphost:/ tourn_offline.gif | Play Tournament | tnmthost:// tour.html | apphost:/ tourn_offline.html | Y |
| 4 | Slot Stats | Statistics for slots | statshost: 3320 | statshost:// statsicon.gif | apphost:/ stats_offline.gif | Check Stats | statshost:// stats.html | apphost:/ stats_offline.html | N |
| 5 | PPV | PayPer View | Ppvhost | ppvhost:// ppvicon.gif | apphost:/ ppv_offline.gif | Pay Per View Video Clips | Ppvhost:// ppvall.html | apphost:/ ppv_offline.html | Y |

AppID and AppName: Unique id and name assigned to application.
Description: Description of the application.
AppHost: Address to communicate with the application host.
IconImg and IconTxt: Icon image and text that are used to represent the application in the Panel. The icon image could live on the application/game server.
OfflineIconImg: In case the application/game server is down, a fallback icon image on the apphost.
AppURL: URL that points to the live application.
OfflinePage: In case the application/game server is offline, use this page to indicate offline status.
Status: Bit indicating whether application/game server is online.

Storing some of the application/game's information in the Browser Managers tame and keeping it updated regularly, reduces the amount of data transferred from the Application/game servers every time the application/game is invoked on a Player Terminal (i.e., Electronic Gaming Machine).

Registration and Player Terminal (PT) Enrollment with Browser Manager

On Player Terminal (i.e., electronic gaming machine) startup, the Browser Manager 100 could send an enrollment (or registration) message to the Browser. Manager 100 passing it information such as the primary game, IP address, the screen resolution the Player Terminal is in, and the Browser Space available. The Browser Manager 100 stores this in a table tblPTinfo. As time passes, if players insert their card into the Player Terminal, that card info can be entered in the PlayerID field.

TABLE: 'tblPTinfo'

Description: This table is used to keep track of the Player Terminals on the floor and the state that they are in.

| PT ID | PT IP | PrimaryGame | ResX | ResY | Browser SpaceW | Browser SpaceH | Player ID | Online |
|---|---|---|---|---|---|---|---|---|
| 1 | 10.10.3.31 | AuctionFever | 800 | 600 | 800 | 600 | | Y |
| 4 | 10.10.3.55 | Poker | 1280 | 1024 | 1280 | 1024 | | Y |
| 20 | 10.10.3.43 | Roulette | 1360 | 768 | 1360 | 768 | | y |
| 50 | 10.10.3.20 | Blazing7s | 1024 | 768 | 1024 | 768 | | y |

| | |
|---|---|
| PT ID, PT IP | PT identifier and IP address |
| PrimaryGame | Primary game on PT |
| ResX | Screen resolution X |
| ResY | Screen resolution Y |
| Browser SpaceW | Available Browser space width |
| Browser SpaceH | Available Browser space height |
| PlayerID | Player ID if available |
| Online | Is PT online |

The PrimaryGame information can be conveyed to the Dynamic Glass Server to display paytable or other graphics. The Dynamic Glass Server could use a collection of PHP scripts connected to a database and a set of images. In the most basic cases where the secondary display is just an HTML page with one image, and maybe some standard text, a generic script glass.php could be used. If more elaborate pages with multiple images are needed, then custom php scripts could be written and entered into a table as shown below. The scripts could also read in the resolution of the Player Terminal and generate pages with different sized images.

TABLE

Tblgamepaytables

| GameID | PrimaryGame | Script | Image |
|---|---|---|---|
| 1 | FourAlarmBonus | glass.php | images/fabpaytable.gif |
| 2 | Blazing7s | glass.php | images/b7paytable.gif |
| 3 | AuctionFever | auctionfever.php | |
| 4 | Poker | Poker.php | |

Description: This table is managed by the sysadmin and is used to associate primary games with paytable graphics for the secondary screen.
GameID: Identifier to the Player Terminals primary game. Used for mapping to paytable graphics on the secondary screen.
PrimaryGame: Name of the Player Terminals primary game.
Script: Active script that presents the primary game related content (e.g. paytables) on the secondary screen.
Image: A primary game image for use with a generic script(glass.php) that just displays one image in an HTML page.

Example: If a Player Terminal with the FourAlarmBonus game is booted up.

Figure 5B:
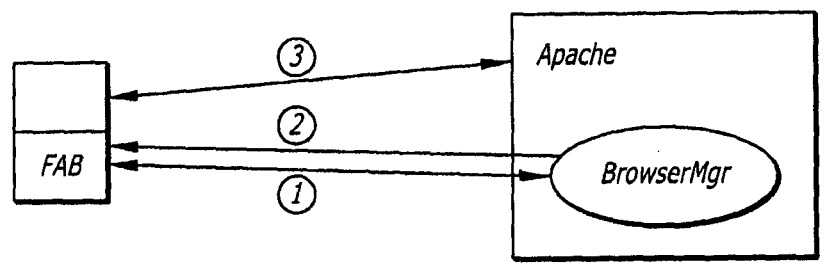
FIG. 5B illustrates the interaction of the Player Terminal and Browser Manager.

As shown in FIG. 5B, the interaction of the Player Terminal and Browser Manager is presented. (1): Player Terminal (PT) boots up. PT: Browser Manager sends an enrollment message to the Browser Manager with information about itself e.g. Enroll(GameName, screen resolution, Browser space). (2): Browser Manager replies with a layout and a URL for the secondary display 1 0 70 100 30 0 BANNER apphost/glass.php?gameID=1 Browser Manager creates one Browser window and hands it the URL. (3): The Browser window loads apphost/glass.php, which looks up tblGamePayTables and generates the paytable page with the gif. Had it been the AuctionFever or Poker game that booted up, the Browser Manager would have replied with apphost/auctionfever.php If the script was resolution dependant, then, for example, apphost/poker.php?ResX=1024&ResX=768.

In the atypical event, that a game does not have an entry in the tblGamePayTables table, a default banner URL could be sent.

Browser Layouts

In one embodiment of the browser manager operating system 10, Browser Layouts present a flexible scheme that may allow multiple and different screen layouts. The example below shows three sample layouts with the information stored in two tables (tblPanes and tblLayouts).

Table tblPanes contains a list of the pane configurations used with x, y, w, h values in percentages. Translation to pixels may be done on the individual Player Terminals, which could have different resolutions under different games.

Table tblLayouts contains the layouts with each pane in the layout as a separate row. Panes of type PANEL indicate which pane the result of the panel selections may be shown in. For example, in the table below, Pane 2 contains the Panel, and its child is Pane 1. Therefore, any windows controlled by the Panel are defined to appear in Pane 1.

A few Example screen layouts→

TABLE tblLayouts

| LayOutID | PaneID | Type | ChildPaneID |
|---|---|---|---|
| 0 | 0 | | |
| 1 | 1 | | |
| 1 | 2 | PANEL | 1 |
| 2 | 3 | | |

TABLE-continued tblLayouts

| LayOutID | PaneID | Type | ChildPaneID |
|---|---|---|---|
| 2 | 4 | PANEL | 3 |
| 2 | 5 | | |

TABLE

```
┌─────┐   ┌─────┐   ┌─────┬─────┐
│  0  │   │  1  │   │  3  │  4  │
└─────┘   └─────┘   └─────┴─────┘
          ┌─────┐   ┌─────┐
          │  2  │   │  5  │
          └─────┘   └─────┘
``` tblPanes (values in percentages)

| PaneID | X | Y | W | H |
|---|---|---|---|---|
| 0 | 0 | 0 | 100 | 100 |
| 1 | 0 | 0 | 100 | 70 |
| 2 | 0 | 70 | 100 | 30 |
| 3 | 0 | 0 | 70 | 80 |
| 4 | 70 | 0 | 30 | 80 |
| 5 | 0 | 80 | 100 | 20 |

Full screen Splash/Banner
1: App/Game
2: Panel
3: App/Game
4: Panel,
5: Banner/Ad Adding a new layout means adding new or reusing existing panes in the 'tblPanes' table, and then making the appropriate entries in the 'tblLayouts' table. If there is no panel in the new layout, the Type fields may be blank. A GUI tool could be developed that allows the sysadmin to create, edit, and manage layouts in the database.

Dynamic layouts, as opposed to the static layouts mentioned above are considered within the scope of the disclosed embodiments. For example, in a 1 pane layout, say a 2nd, or 3rd pane and windows are to be added for marketing/promotional purposes. Dynamic panes and layouts sound appealing and would render tblPanes unnecessary. However, as the panes grow and shrink, the Browser windows wouldn't automatically resize images. The above assumes that there may be one rectangular region dedicated for Browsers, divided up into panes. There may be instances where there is no such dedicated region, and Browser windows may be shown at any location; such as a single widescreen, with a couple of Browser windows displaying promotions, at arbitrary locations.

Sliding/Popup Windows

In some embodiments of the browser manager operating system 10, to avoid having to resize panes, windows and content, popup windows could be used. In this regard, consider several Player Terminals on the floor showing paytables on the secondary screen. A department at the resort (gaming/dining/entertainment) works on a promotion and creates a page (W: 800, H: 200), that it needs to display at the top/bottom of the second screen. It can request the Browser Manager 100 to show a popup window for all/a selection of Player Terminals. The Browser Manager 100 sends the command down to the Player Terminals, which show the popup window with the promotional URL in a Browser window. This window can start flattened on one axis and expands steadily in size in about 1-2 s, until it reaches the final size (800,200). A smooth transition like this would be less visually jarring, than having a popup window suddenly show up on screen. The Player Terminal: Browser Manager 100 would control the window resizing between the initial and final window sizes. Having browser window transparency may be good to use for popups too.

Screen Resolutions

In one embodiment of the browser manager operating system 10, the presence of Player Terminals with different Screen resolutions needs to be taken into account when dealing with content and layouts. The content can be designed to take up all available Browser space, but there is no inherent capability of a Browser to scale content. For example, a game with graphics for an 800×600 window may not be automatically scaled by the Browser to larger graphics in a 1280×1024 window. However, the html could be altered at source to display a scaled image.

Figure 5C:
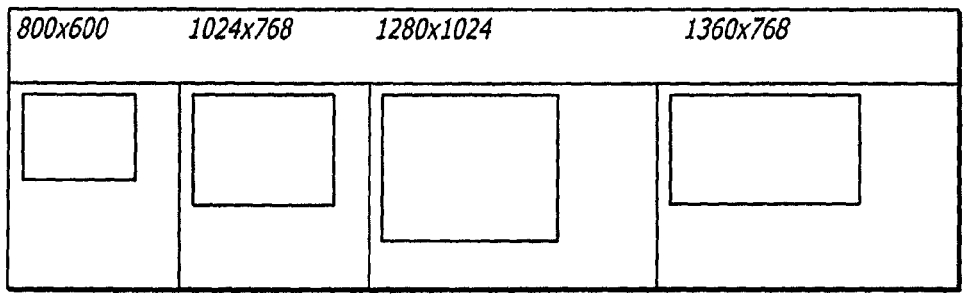
FIG. 5C illustrates possible screen resolutions with relative sizes shown to scale.

Possible screen resolutions are shown in FIG. 5C. Relative sizes are to scale.

Browser Content developers may need to design their content to utilize Browser space efficiently. Banners/Splash screens can be easily designed for multiple resolutions using HTML elements. However, displaying fixed width content like Flash games, may be less straightforward. An option may be to develop the games with different resolutions and have the Browsers load the appropriate resolution games.

Custom Panels

Figure 5D:
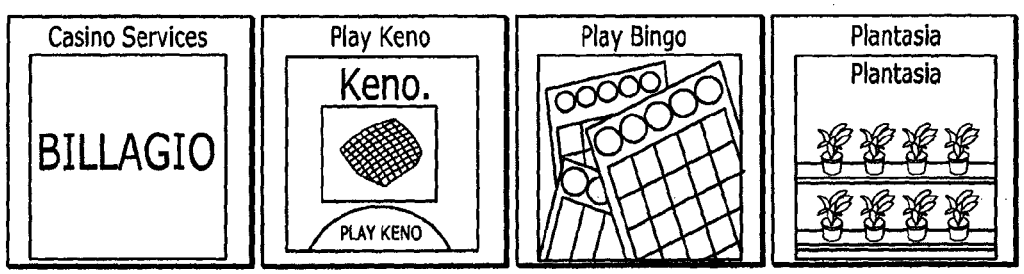
FIG. 5D illustrates a generated web page with buttons and embedded javascript, in response to the Browser Manager pulling up the icon and URL information for the specified applications.

To generate a custom panel, a PHP script could be used that takes application names as arguments, connects to the applications database, pulls up the icon and URL information for the specified applications from tblApps, and generates a web page with buttons and embedded javascript; which the Browser may then display on the Panel window, as shown in FIG. 5D.

URL(apphost://apps.php?NumApps=4&App1=Casino%20Services&App2=Keno&App3=Bingo&App4=Plantasia)

Figure 5E:
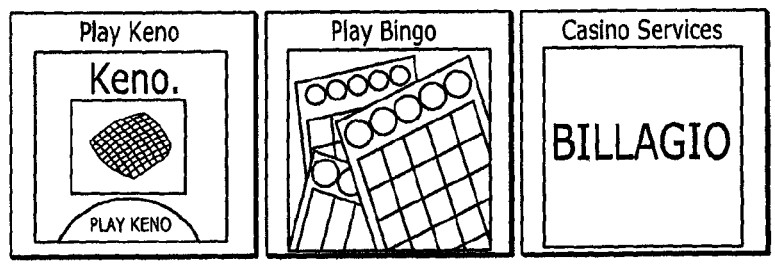
FIG. 5E illustrates a generated web page with buttons and embedded javascript, in response to the Browser Manager pulling up different URL information.

If it was a different player with a different set of games, or some other reason, the Browser Manager 100 could send down a different URL, as shown in FIG. 5E.

apphost://apps.php?player=123456&NumApps=3&App1=Keno&App2=Bingo&App3=Casino%20Services resulting in a different panel as shown in FIG. 5E.

The script also handles dimensions of buttons, background and the like. When the player chooses an application by selecting the application button, there needs to be some way of depicting that, which is the currently selected application. Non-limiting examples include either by showing the button in a depressed state or a different color and the like.

Players would be identified by their ID/Tracking number, if present. To determine what options are to be presented to the player, there needs to be some mapping of Player ID to applications (e.g., through a table).

Mapping Layouts to Content

In one embodiment, the Browser Manager 100 needs to map content URLs to layouts. There is a standard predefined sequence of layouts and content URLs presented. Alternatively, the layout may it be dynamic, player, and preferences based.

Startup

For example, on a Player Terminal (ID-20) startup, the Browser Manager 100 could send a default Banner URL

| Numwindows | | | | | | |
|---|---|---|---|---|---|---|
| x | y | w | h | z | type | url |
| 10 | 70 | 100 | 30 | 0 | BANNER | apphost/welcome.php |

This banner/splash would be server driven and employ client-pull or server-push techniques to display different paytable/promotional/marketing web pages. Normally, a browser window is told to open to a specific URL and then the client window pulls the content down using HTTP POST or HTTP GET function calls. The push function may also be used by a third party server to fire javascript functions on the HTML page.

Initiating Browser Applications

In one embodiment of a browser manager operating system 10, a browser application is initiated in response to some event (e.g., player inserts card/player inserts money/some event at host). Through some logic, (e.g., a rule-based system that determines the screen space negotiation) the Browser Manager 100 decides or is instructed to use Layout1 and present four applications in the panel. A specific, non-limiting example of the panel URL is as follows:

apphost://apps.php?NumApps=4&App1=Casino%20Services&App2=Bingo&App3=Keno&App4=SlotStats The Browser Manager 100 looks up Layout1 in tblLayouts, sees that there is a panel defined, and for each application, defines a separate window in the child pane. So for four applications, it opens up four stacked windows in the child pane, with the application URLs pulled up from tblApps. If the Game/Application Server is offline, the Browser Manager 100 sends the offline URL.

Figure 5F:
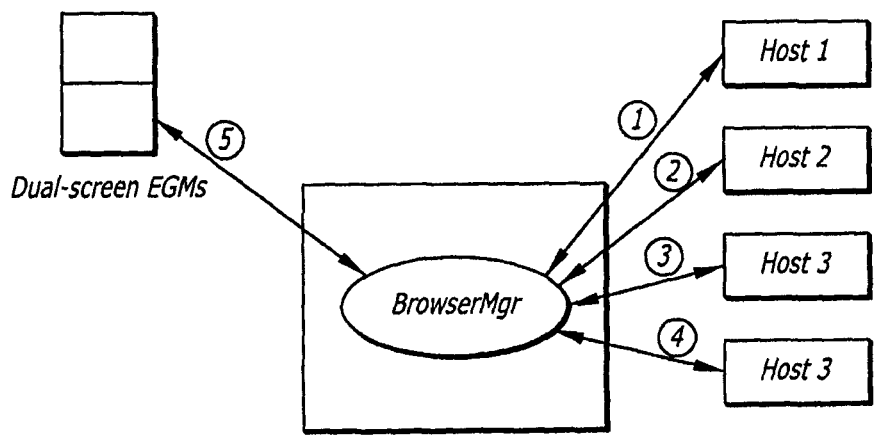
FIG. 5F illustrates the Browser Manager looking up a layout from multiple hosts.

As shown in FIG. 5F, the Browser Manager 100 looks up a layout as follows: (1) Browser Manager asks Host1(CasinoServices) if it is up. Response Y. (2) Browser Manager asks Host2(Bingo) if it is up. Response Y. (3) Browser Manager asks Host3(Keno) if it is up. Response Y. (4) Browser Manager asks Host4(SlotStats) if it is up. No Response Browser Manager marks SlotStats record in database as offline. (5) Browser Manager forms message with layout and URLs and sends to Player Terminal: Browser Manager.

In this example, of the four stacked application windows; the first three would be live URLs pointing to the application/game servers. The fourth window for the offline applications (SlotStats) would show the predefined Offline page for SlotStats.

track of sessions and Browser windows through the tables 'tblSession' and 'tblSessionApps'.

TABLE: tblSession

| Session-ID | PT-ID | PlayerID | Start-Time | End-Time | Layout-ID |
|---|---|---|---|---|---|
| 1 | 4 | | 4/3/06 11:25 am | | 1 |
| 2 | 1 | | 4/3/06 12:25 pm | | 1 |
| 3 | 20 | | 4/2/06 8:00 am | | 0 |

| | |
|---|---|
| Session ID: | Unique session identifier |
| PT-ID: | PT the session was played at |
| Player-ID: | ID of Player if available |
| Start-Time: | Time the session began |
| End-Time: | End time of session |
| Layout-ID: | Layout used in session |

TABLE: tblSessionApps

Following example shows entries for 3 Player Terminals:
Session 1 with panel and 4 apps,
Session 2 with panel and 3 apps,
Session 3 with one banner window.

| SessionID | AppName | SessionWnd-ID | Z-Level | GameID |
|---|---|---|---|---|
| 1 | PANEL | 0 | ACTIVE_Z | |
| 1 | Casino Services | 1 | ACTIVE_Z | |
| 1 | Bingo | 2 | 0 | |
| 1 | Keno | 3 | 0 | |
| 1 | SlotStats | 4 | 0 | |
| 2 | PANEL | 0 | ACTIVE_Z | |
| 2 | Casino Services | 1 | ACTIVE_Z | |
| 2 | Bingo | 2 | 0 | |
| 2 | SlotStats | 3 | 0 | |
| 3 | BANNER | 0 | ACTIVE_Z | |

| | |
|---|---|
| Session ID: | Unique session identifier |
| AppName: | Name of application |
| SessionWnd-ID: | Zero based ID assigned to window |
| Game ID: | If available, a unique GameID obtained from the app/game server |
| Z-Level: | The Z level the window is currently at |

[e.g. ACTIVE_Z = 100 INACTIVE_Z = 0]

Application Comes Back Online

In one embodiment of a browser manager operating system 10, when SlotStats comes online again, it sends a Register message to apphost/Browser Manager 100. The Browser Manager 100 performs a handshake, and may exchange some data with SlotStats. It updates the Status field in the 'tblApps'

| Numwindows | | | | | | | |
|---|---|---|---|---|---|---|---|
| x | y | w | h | z | type | url | |
| 50 | 70 | 100 | 30 | 10 | PANEL | apphost://apps.php?player=123456&NumApps=4&App1=Casino%20Services&App2=Bingo&App3=Keno&App4=SlotStats | |
| 0 | 0 | 100 | 70 | 10 | PANEL_CHILD1 | svcshost://services.php?player=123456 | |
| 0 | 0 | 100 | 70 | 0 | PANEL_CHILD2 | bingohost://bingo.cgi | |
| 0 | 0 | 100 | 70 | 0 | PANEL_CHILD3 | kenohost://keno.php | |
| 0 | 0 | 100 | 70 | 0 | PANEL_CHILD4 | apphost://stats_offline.html | |

In one embodiment of a browser manager operating system 10, the panel window would execute apphost://apps.php, which would present the application buttons in a customized web page. If the player is identified through their player card, the player's info, pulled up from the Player Tracking database could also be used for custom, player-specific presentations in the Browser windows. Browser Manager 100 would keep table; searches the 'tblSessionApps' table, finds all instances of SlotStats, and sends a LoadURL message for the appropriate windows for each of those Player Terminals. For example:

10.10.3.31 LoadURL(4 statshost://stats.html)

10.10.3.55 LoadURL(3 statshost://stats.html)

Application Goes Offline

In the reverse situation where the applications have been loaded in ready state and one of them goes down, a similar process takes place. The Browser Manager 100 expects a heartbeat from each application regularly. However, if Slot-Stats goes down, then the Browser Manager 100 gets no heartbeat from SlotStats a few times in succession. In response, the Browser Manager 100 updates the SlotStats records in tblApps' table with Status 'Down/0', searches the 'tblSessionApps' table for all instances of SlotStats and sends the LoadURL message to each of the Player Terminals with the offline URL. For example:

10.10.3.31 LoadURL(4 apphost:/stats_offline.html)
10.10.3.55 LoadURL(3 apphost:/stats_offline.html)

Application Selection/Switching

In another embodiment of a browser manager operating system 10, when the player presses a button on the panel, that aplication's window is raised in the child panel, and the other windows are sent behind it or made invisible. This allows easy, fast switching between applications. This can be done by the Javascript function attached to each button, sending a message to the Browser Manager 100.

For example, if on Player Terminal ID-1, the Keno button was pressed, the Javascript function attached to the button would send a message like 'Keno/App2 selected'. The Browser Manager 100 would receive the message, lookup the mapping of the appname/appid(Keno/2) to Browser window for Player Terminal ID-1 in the tblSessionApps table, and see that the Keno window's ID is three. It would raise the Keno window's Z level to ACTIVE_Z and lower the Z level for the other child windows.

TABLE tblSessionApps

| SessionID | AppName | SessionWnd-ID | Z-Level | GameID |
|---|---|---|---|---|
| 1 | PANEL | 0 | ACTIVE_Z | |
| 1 | CasinoServices | 1 | 0 | |
| 1 | Bingo | 2 | 0 | |
| 1 | Keno | 3 | ACTIVE_Z | 1234 |
| 1 | SlotStats | 4 | 0 | |

A message is then sent to the Browser Manager 100 on the Player Terminal ID-1 to raise the window id:three, or hide the other windows.

10.10.3.31 SetZOrders (3 ACTIVE_Z 1 INACTIVE_Z 2 INACTIVE_Z 4 INACTIVE_Z)

Multiple Browser Windows Per Application

In an embodiment, browser applications may be able to perform all foreseen operations within a single browser window using various web technologies like DHTML, and the like. There are cases where a browser application may find the need to open a new browser window to display a message like a promotion, a win, and the like. The Browser Application designers will need to define whether they can do it with just one window or multiple windows.

However, for now, to accommodate the possibility that an AppServer may need to open multiple browser windows, we may consider that each AppServer may maintain a sequential list of window Ids. On the Browser Manager side, the table tblSessionApps may contain a mapping of the application's windowIDs (AppWndID) and the session's windowIDs (SessionWndID). For example, the Keno application, may open a new window (ID:1) with Z-order 10 at a later stage. The Browser Manager 100 adds that window to the tblSessionApps table and assigns it the next available ID (e.g. 5). For Keno's 3rd window, the Browser Manager 100 would assign ID 6, and so on.

TABLE: tblSessionApps

| SessionID | AppName | Session WndID | Z-Level | App WndID | GameID |
|---|---|---|---|---|---|
| 1 | PANEL | 0 | ACTIVE_Z | 0 | |
| 1 | Casino Services | 1 | 0 | 0 | |
| 1 | Bingo | 2 | 0 | 0 | |
| 1 | Keno | 3 | ACTIVE_Z | 0 | 1234 |
| 1 | SlotStats | 4 | 0 | 0 | |
| 1 | Keno | 5 | ACTIVE_Z + 10 | 1 | |
| 1 | Keno | 6 | ACTIVE_Z + 15 | 2 | |

When the player switches from Keno to Bingo in the panel, all of Keno's windows may have their z orders moved back.

Third Party Browser Based Game Play

In one embodiment of a browser manager operating system and method 10, when the player starts a game (e.g. by pressing a button on the Keno page), the page requests a game from the Game Server. The Game Server requests approval from the Transaction Manager 110. The Transaction Manager 110 in turn queries the Player Terminal (OS-gamemgr) for credits. If the Player Terminal has the credits, it deducts the credit meter and sends a response (ACK/yes) to the Transaction Manager 110. The Transaction Manager 110 records the transaction in its database and sends the approval message to the Game Server.

The Game Server starts a game and sends a StartGame message with the GameID (e.g., 1234) to the Browser Manager 100. The Browser Manager 100 records the GameID in the tblSessionApps table. This allows the Browser Manager 100 to resume the game, if the player cashes out before seeing the game complete, and returns at a later time. When the game is completed, the game server sends an EndGame message with the GameID. The Browser Manager 100 erases the GameID field of that session.

Figure 5G:
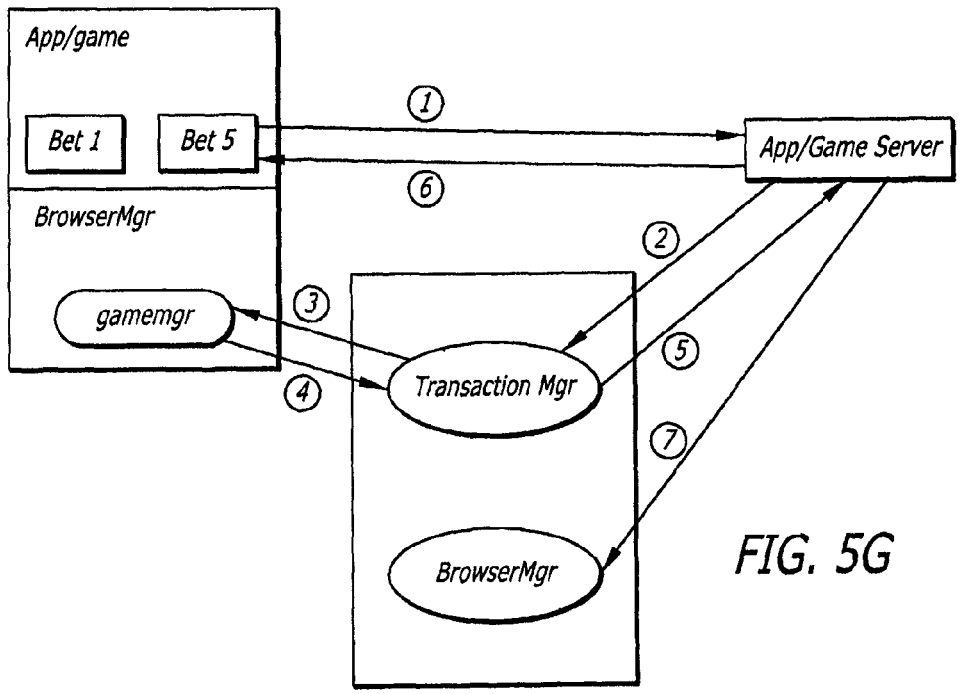
FIG. 5G illustrates the game server initiating a game with the Browser Manager and the Transaction Manager.

As shown in FIG. 5G the game server initiates a game with the Browser Manager as follows: (1) Bet 5. Player hits a bet 5 button placing a wager/play a game. The message is sent to the originating game server. (2) Debit 5. The Game server asks the Transaction Manager 110 if the credits are available and claimed for game play. (3) Transaction Manager 110 sends a message to the Player Terminal asking for 5 credits. (4) Gamemgr tries to deduct credits by 5 and sends status to Transaction Manager 110. (5) Transaction Manager 110 records the transaction in its database and sends Y,N to Game server. (6) Game server either commences game or disallows it. (7) If game is started, GameServer sends GameID to Browser Manager 100 which records it in the table.

Alerting a Player Through the Panel

In one specific, non-limiting embodiment, the player is playing Keno, makes a wager, and is waiting for the result. He switches to another application, for example News/Bingo. When the Keno game needs to catch the player's attention, it may send a command via the Browser Manager 100, to red flash the Keno button in the panel or something similar. This can be done by a javascript function on the page that changes the background color of the specified button in a pre-specified color loop.

For example, there may be an event at the Keno Application Server that needs the attention of all the Player Terminals playing Keno. The players may not have the Keno screen active at that moment. The Keno server sends a message to the Browser Manager 100 requesting the attention of players who may not have the Keno window active.

The Browser Manager 100 looks through its tblSessionApps table, and for every Player Terminal that has its Keno application at an INACTIVE_Z, sends a message containing the appid, to Browser Manager 100 to execute a generic JavaScript function on the page. The javascript function may use the appid, match it to a button, and could flash that button in red.

The Player sees the flashing Keno button in the panel, clicks on the Keno button and sees an updated Keno page. The button stops flashing when it is clicked. Another approach could be to use an animated gif instead of the colors changing.

| Numwindows | | | | | | |
|---|---|---|---|---|---|---|
| x | y | w | h | Z | type | url |
| 5 | | | | | | |
| 0 | 70 | 100 | 30 | 10 | PANEL | apphost://apps.php?player=123456&NumApps=4&App1= Casino%20Services&App2=Bingo&App3=Keno&App4=SlotStats |
| 0 | 0 | 100 | 70 | 0 | PANEL_CHILD1 | svcshost://services.php?player=123456 |
| 0 | 0 | 100 | 70 | 0 | PANEL_CHILD2 | bingohost://bingo.cgi |
| 0 | 0 | 100 | 70 | 10 | PANEL_CHILD3 | kenohost://keno.php?gameId=1234 |
| 0 | 0 | 100 | 70 | 0 | PANEL_CHILD4 | apphost://stats_offline.html |

Using this technique, multiple application/game servers can send messages through Browser Manager 100 to red flash their applications on the panel. For less urgent alerts, different colors (green/yellow) could also be used.

Session Termination

To end a player's sessions, in response to some event (e.g., player cashing out, player taking card out, host determined event), the Browser Manager 100 may send a new layout to the Player Terminal, such as a Browser Manager 100 with just one window displaying a banner (e.g., a marketing screen on the top screen in Idle mode, with for example, "Coming Soon" titles).

| Numwindows | | | | | | |
|---|---|---|---|---|---|---|
| x | y | w | h | z | type | url |
| 1 | | | | | | |
| 0 | 70 | 100 | 30 | ACTIVE_Z | BANNER | apphost//welcome.php |

Referring now to a session termination event (e.g., cashout), the player may be asked if he would like to save his session. If player chooses "Yes," the session tables are updated with the end time. If the player has not been identified by PlayerID, the session identifier can be printed on a ticket. The ticket may be deemed good for a predetermined (30/60/ etc) number of days. If player chooses "No," the session entries may be deleted from the session tables.

Alternatively, if there is any game/application that the user is using, that is in a 'waiting for completion' state, just print the ticket, and don't ask the user. If there is no such game/application that the player is waiting on, just end the sessions without asking. Delete the session entries from the session tables.

With respect to session resumption, when the player returns at a later time and inserts the ticket at any Player Terminal, the SessionID is read from the ticket, and sent to the Browser Manager 100. The Browser Manager 100 looks at the session tables, pulls the information for the session, and prepares a message to the Player Terminal with the Browser layout and URL information. If the player had been waiting for a game result when he cashed out; there should be a GameID for that game session in the tblSessionApps table. The Browser Manager 100 may include that GameID in the URL message. The Browser windows then load the URLs with GameIDs, pointing to the game servers. The game servers pull up the results for that game and present it in the Browser windows.

An example message for resuming a session: Suppose the Keno game was in waiting mode when the session termination/cashout occurred. On resumption, the Browser Manager 100 would see a GameID is present for the Keno session and include that in the Keno URL.

In this example, the Keno window is the active window, and its URL would contain the GameID from the last session. The Keno server would look up its database for the results for that particular game and prepare a page with the results.

Messages in the Browser Application System

Figure 5H:
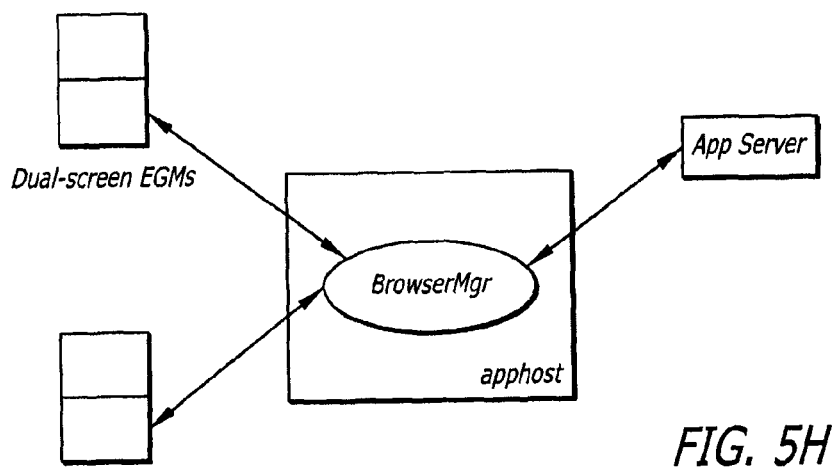
FIG. 5H illustrates the browser manager operating system and the messages used in the Browser application system between the Player Terminals, the Browser Manager, the TransactionManager, and the AppServers.
Figure 6:
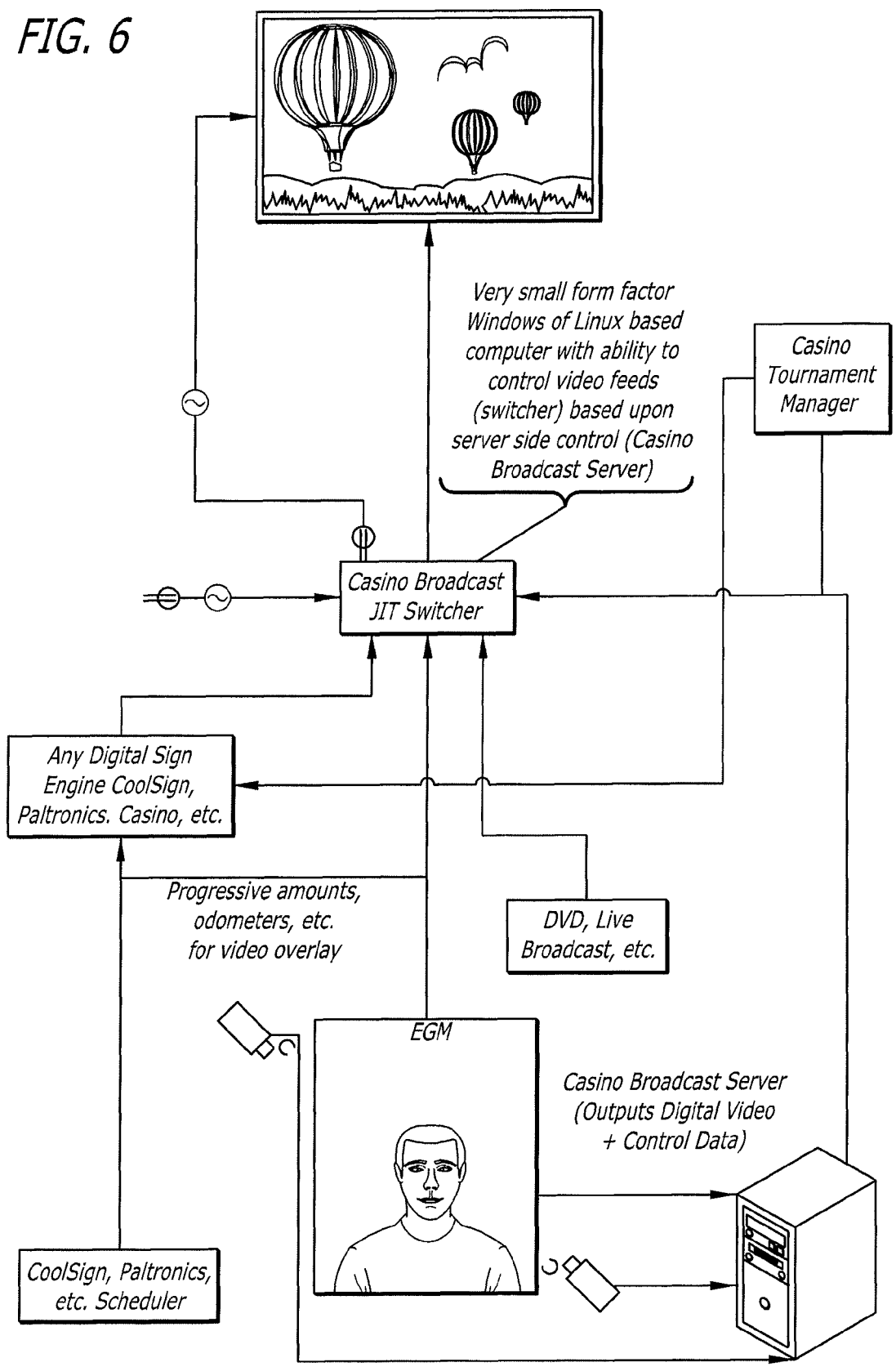
FIG. 6 is a block diagram of a preferred broadcast server and its interconnections to the electronic gaming machine, overhead signage, and the tournament manager server.
Figure 7:
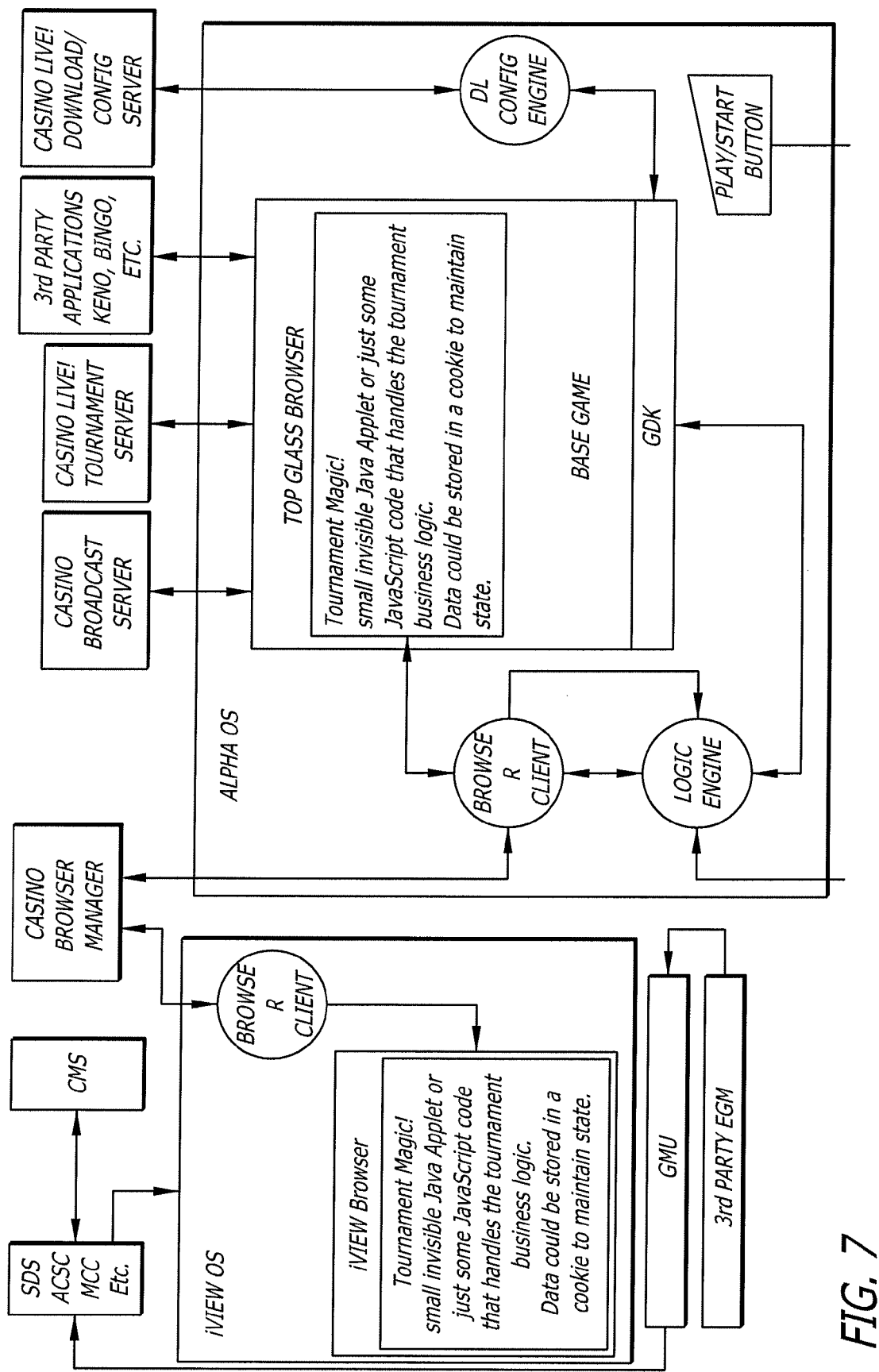
FIG. 7 is a block diagram of the system and client components and the JavaScript bridge that enables communication between the gaming device OS and the Browser page without going through the G2S browser class, which allows for direct and nearly instantaneous updates of the browser screen without having to do round trips to the server.
Figures 1, 8:
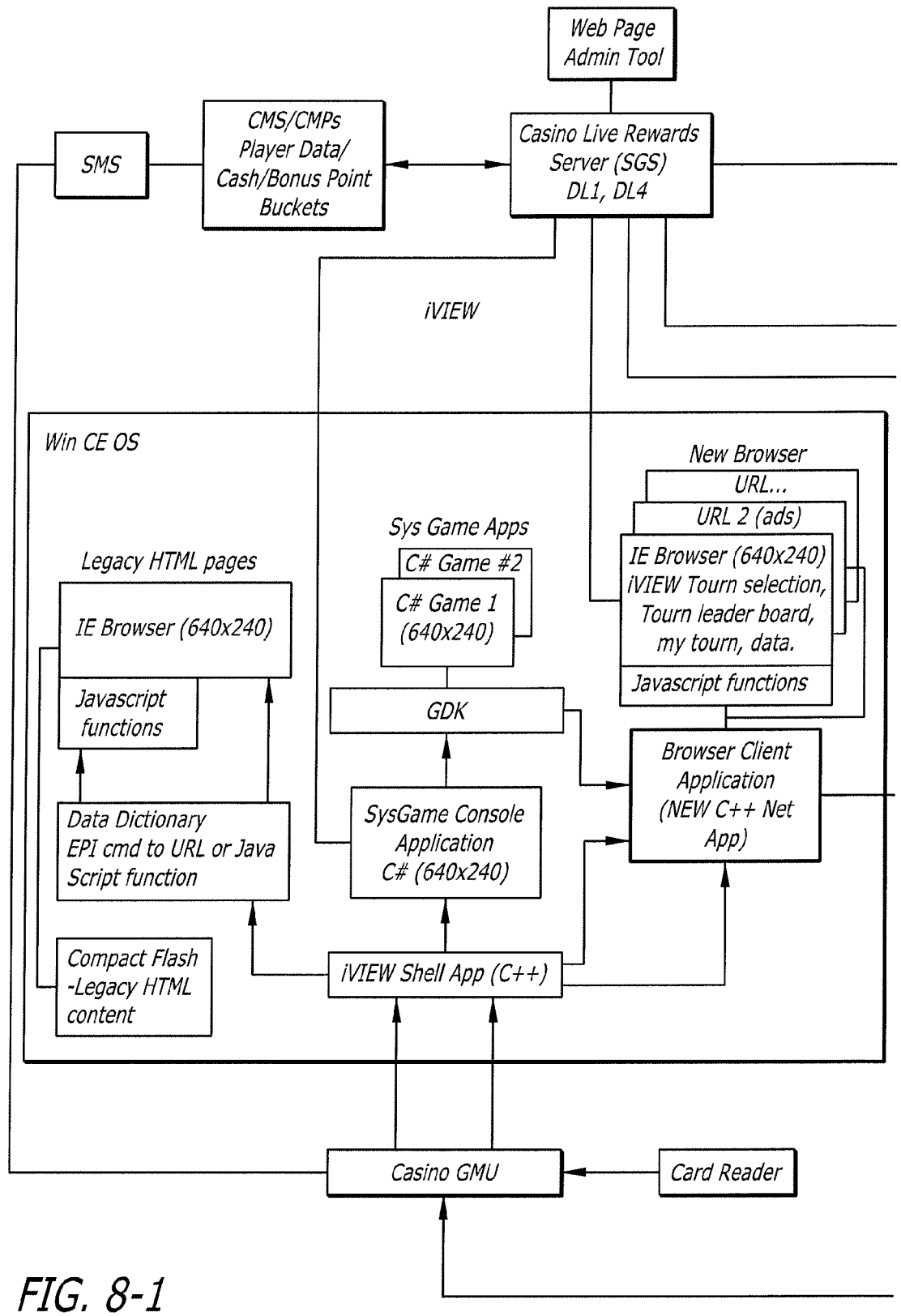
FIG. 8 is a block diagram that displays various servers in the network and how those servers communicate to the various client viewing devices or browser clients (e.g., iVIEW, Bally Alpha Gaming cabinet, and Plasma signs throughout the property)
Figures 2, 8:
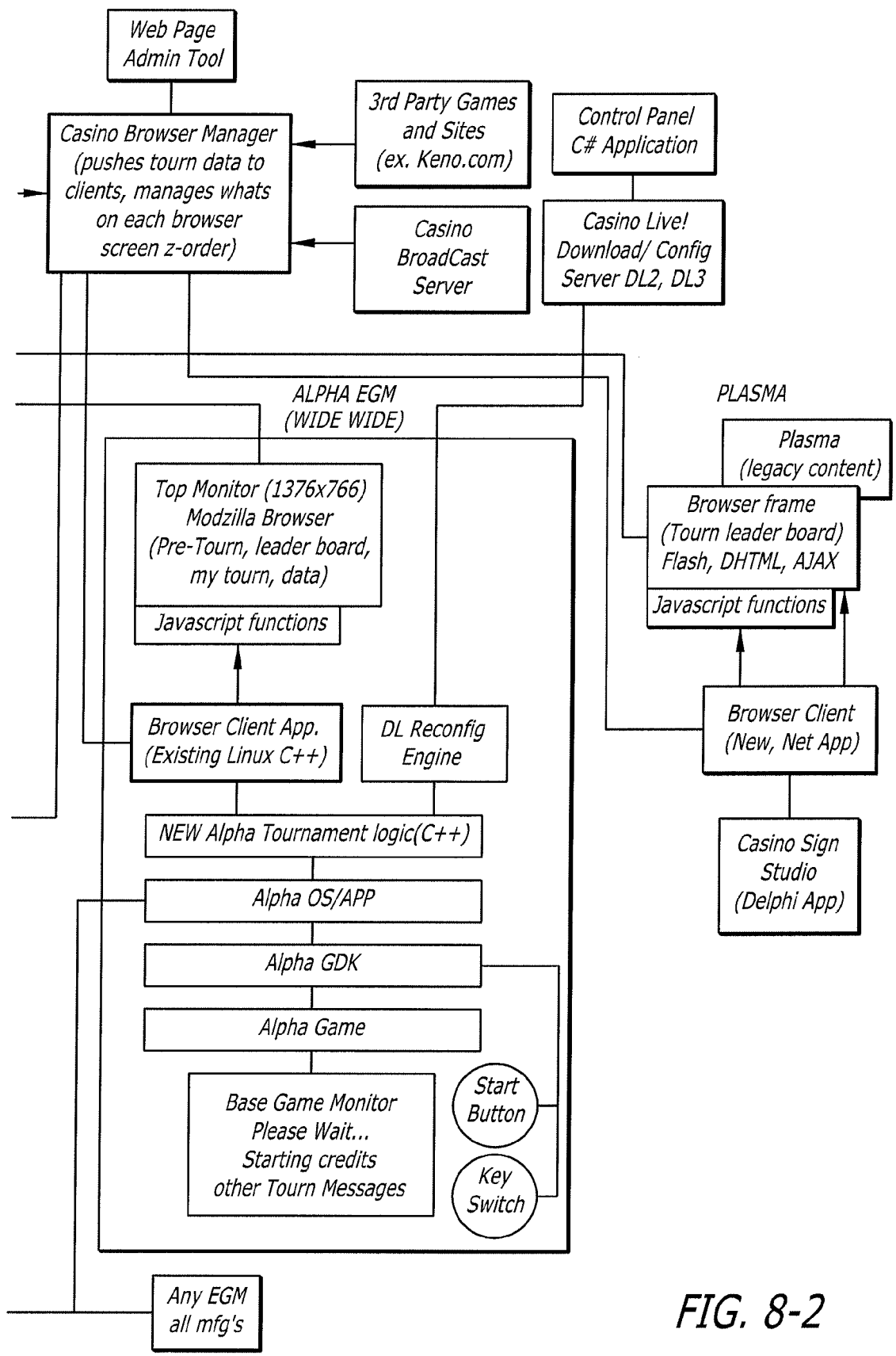
Figure 9:
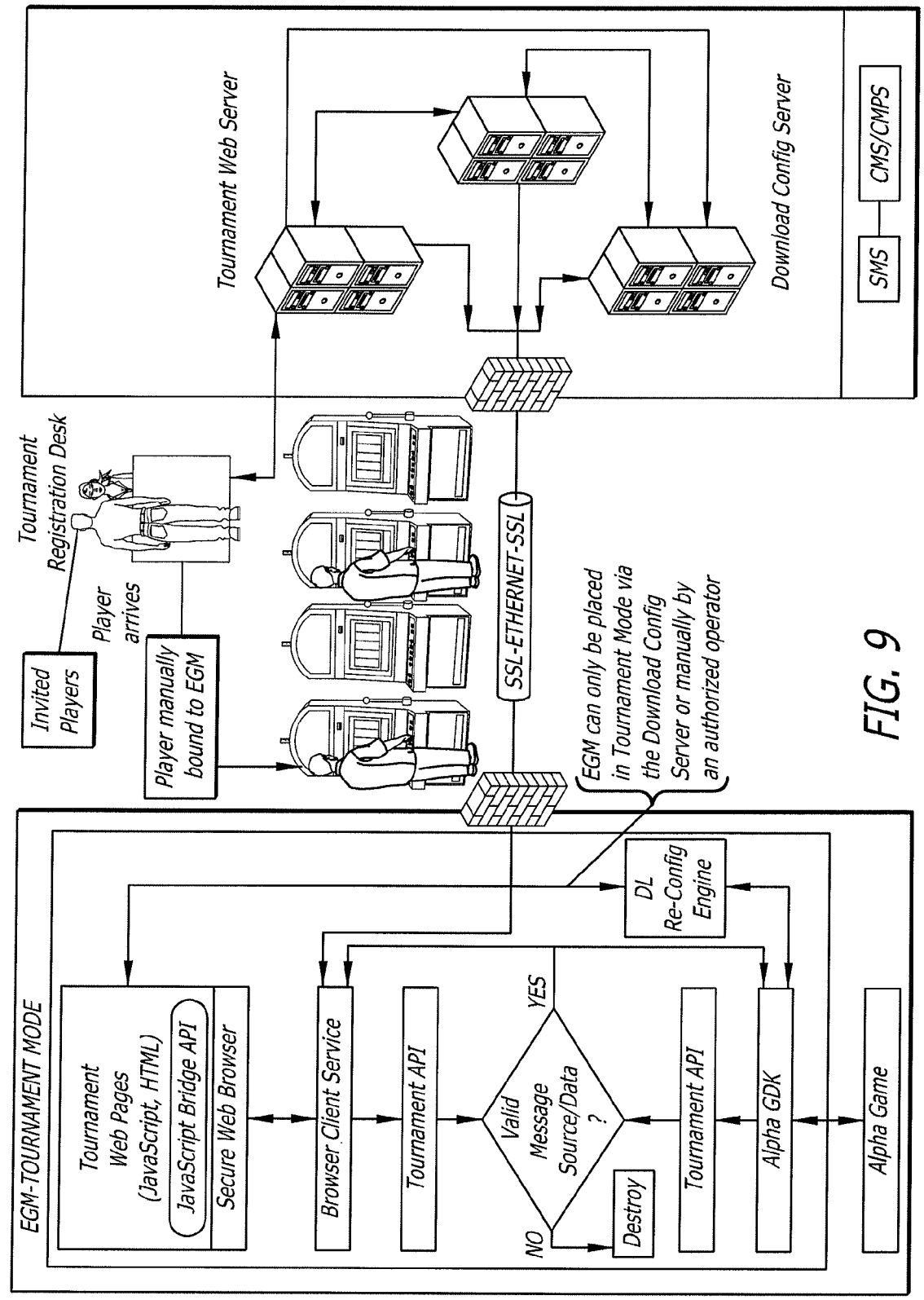
Figures 1, 10:
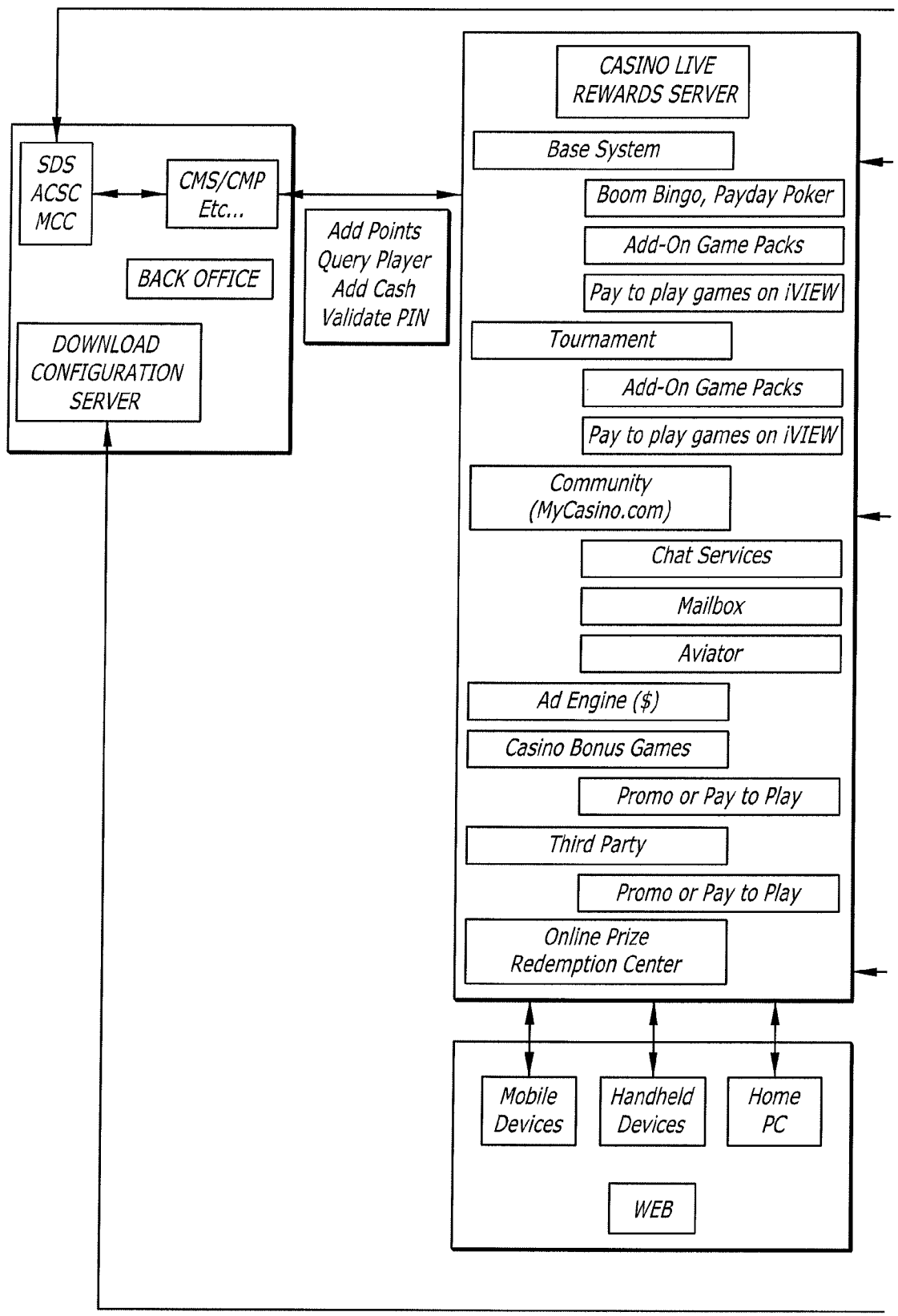
FIG. 10 is a block diagram of the network servers and providing a common tournament server for the Alpha electronic gaming machine floor tournament and the iVIEW tournaments.
Figures 2, 10:
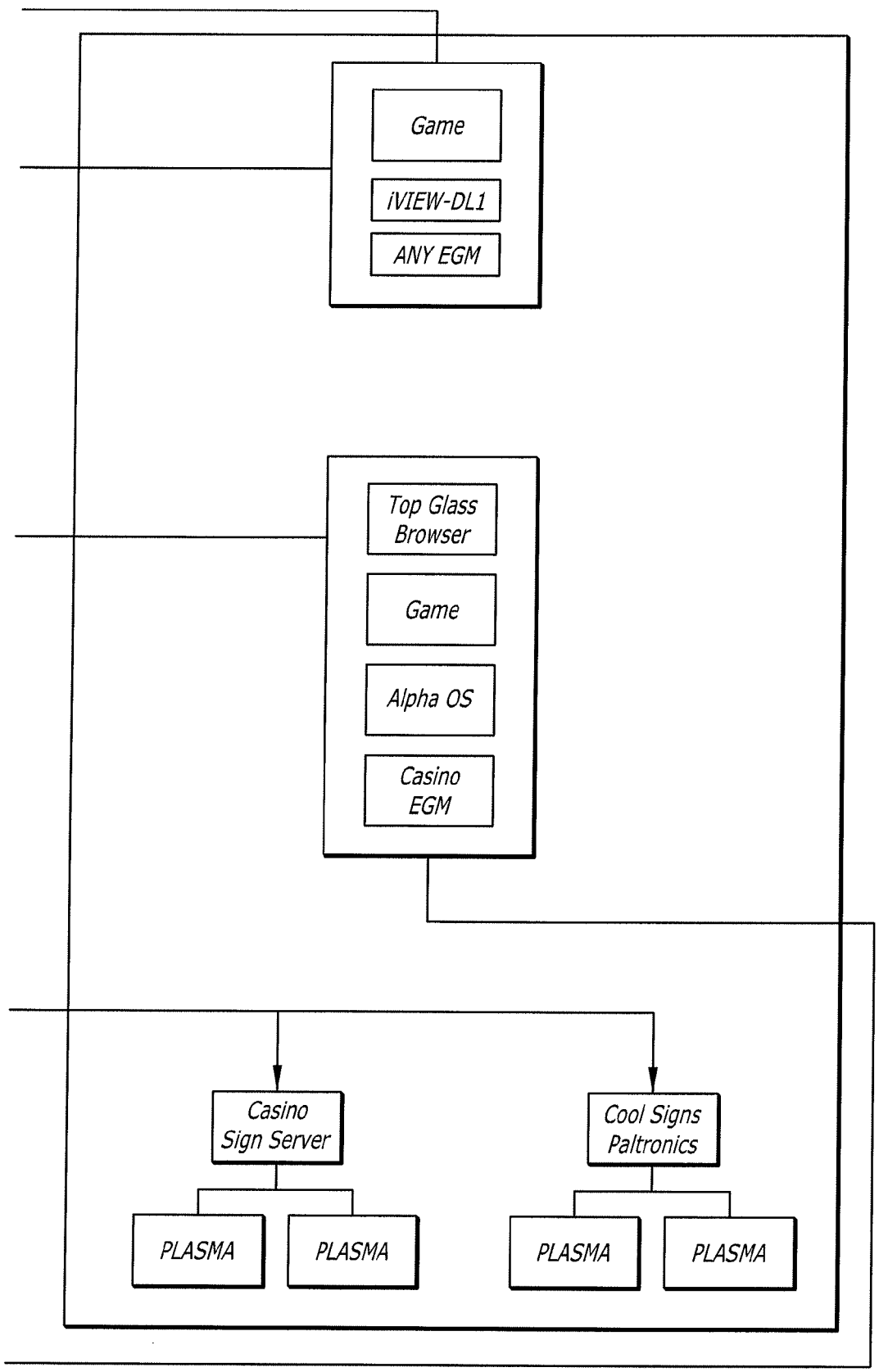

As shown in FIG. 5H, another aspect of the browser manager operating system 10 outlines the messages used in the Browser application system between the Player Terminals, the Browser Manager 100, TransactionManager, and the AppServers. Where applicable, the messages may allow multiple target items to be affected, to facilitate more effectiveness per message and less messaging traffic.

Player Terminal to Browser Manager Messaging—Register

In one embodiment of the browser manager operating system, the player terminal to browser manager message gets sent by the Player Terminal (PT) on boot up to the Browser Manager 100.

Parameters:

| | |
|---|---|
| PT ID | The unique ID assigned to the PT |
| Primary Game | The primary AGP game running on the PT |
| Resolution width, height | The screen resolution the PT is configured for |
| Browser Area W, H | The Browser area in W, H |

Playercardinsert

The playercardinsert message gets sent when a player inserts their card at the Player Terminal.

Parameters:

| | |
|---|---|
| PT ID | The unique ID assigned to the PT |
| PlayerID | Unique player tracking ID |

Playercardremove

The playercardremove message gets sent when a player removes their card at the Player Terminal.

Parameters:

| | |
|---|---|
| PT ID | The unique ID assigned to the PT |
| PlayerID | Unique player tracking ID |

Buyin/Cashin
The buyin/cashin message gets sent when credits are inserted at the Player Terminal.
Parameters:

| | |
|---|---|
| PT ID | The unique ID assigned to the PT |
| PlayerID | Unique player tracking ID if available |

Cashout
The cashout message gets sent when a cashout occurs at the Player Terminal.
Parameters:

| | |
|---|---|
| PT ID | The unique ID assigned to the PT |
| PlayerID | Unique player tracking ID if available |

Heartbeat/Keepalive
The Heartbeat/Keepalive message is sent by the Player Terminal 80 to the Browser Manager 100 to inform Browser Manager that Player Terminal is still alive.
Application Specific Messages
Sendslotsdata
The sendslotdata message is sent by the Player Terminal, on the primary game end event, and carries some accounting meters.
Parameters:

| | |
|---|---|
| PT ID | The unique ID assigned to the PT |
| gamesWon | Number of games won |
| gamesLost | Number of games lost |
| MoneyWon | Total money won |
| MoneyPlayed | Total money played |

Browser Manager to Player Terminal
Setlayout
The Setlayout message is used to send down a predefined screen layout with multiple windows with content URLs. This message is variable length depending on the number of windows. This message can be used for a single or multiple windows.
Parameters:

| | |
|---|---|
| NumWindows [for each window] | Number of windows |
| WndID | Window ID |
| X | Window Left |
| Y | Window Top |
| W | Window Width |
| H | Window Height |
| Z | Z order of the window |
| url | URL the window needs to display |

Setwindowurls
The Setwindowurls message is used to set the URLs for the browser window(s).
Parameters:

| | |
|---|---|
| NumWindows [for each window] | Number of windows |
| WndID | Window ID |
| url | URL the window needs to display |

Showbrowserwindows
The Showbrowserwindows message is used to set the visibility of the browser window(s).
Parameters:

| | |
|---|---|
| NumWindows [for each window] | Number of windows |
| WndID | Window ID |
| Show | Flag indicating whether the window is to be shown or not |

Movebrowserwindows
The Movebrowserwindows message is used to reposition the browser window(s).
Parameters:

| | |
|---|---|
| NumWindows [for each window] | Number of windows |
| WndID | Window ID |
| x | Window Left |
| y | Window Top |
| w | Window Width |
| h | Window Height |
| z | Z order of the window |

Closebrowserwindows
The Closebrowserwindows message is used to close the browser window(s).
Parameters:

| | |
|---|---|
| NumWindows [for each window] | Number of windows |
| WndID | Window ID |

Figures 1, 11:
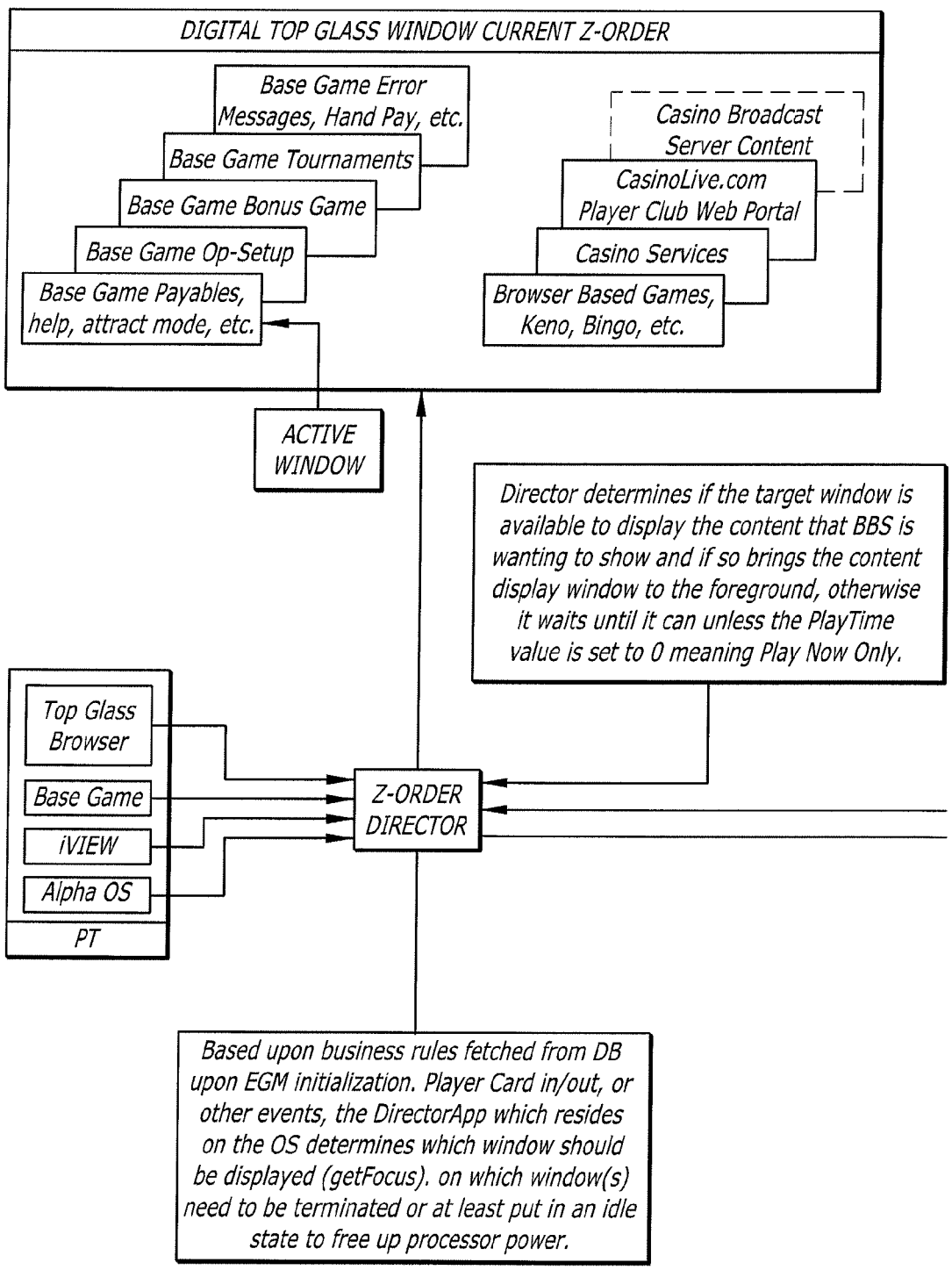
FIG. 11 is a block diagram of the Z-order director application that can frame manage 1 to N browser windows on any device in the casino property, wherein the Z-order director determines the proper Z-order by player requests and casino business rules, wherein the Z-order director receives requests for focus from various clients and servers (e.g., Bally Broadcast Server), and wherein if the business rules allow, the proper browser screen comes into focus and delivers the proper media to the patrons.
Figures 2, 11:
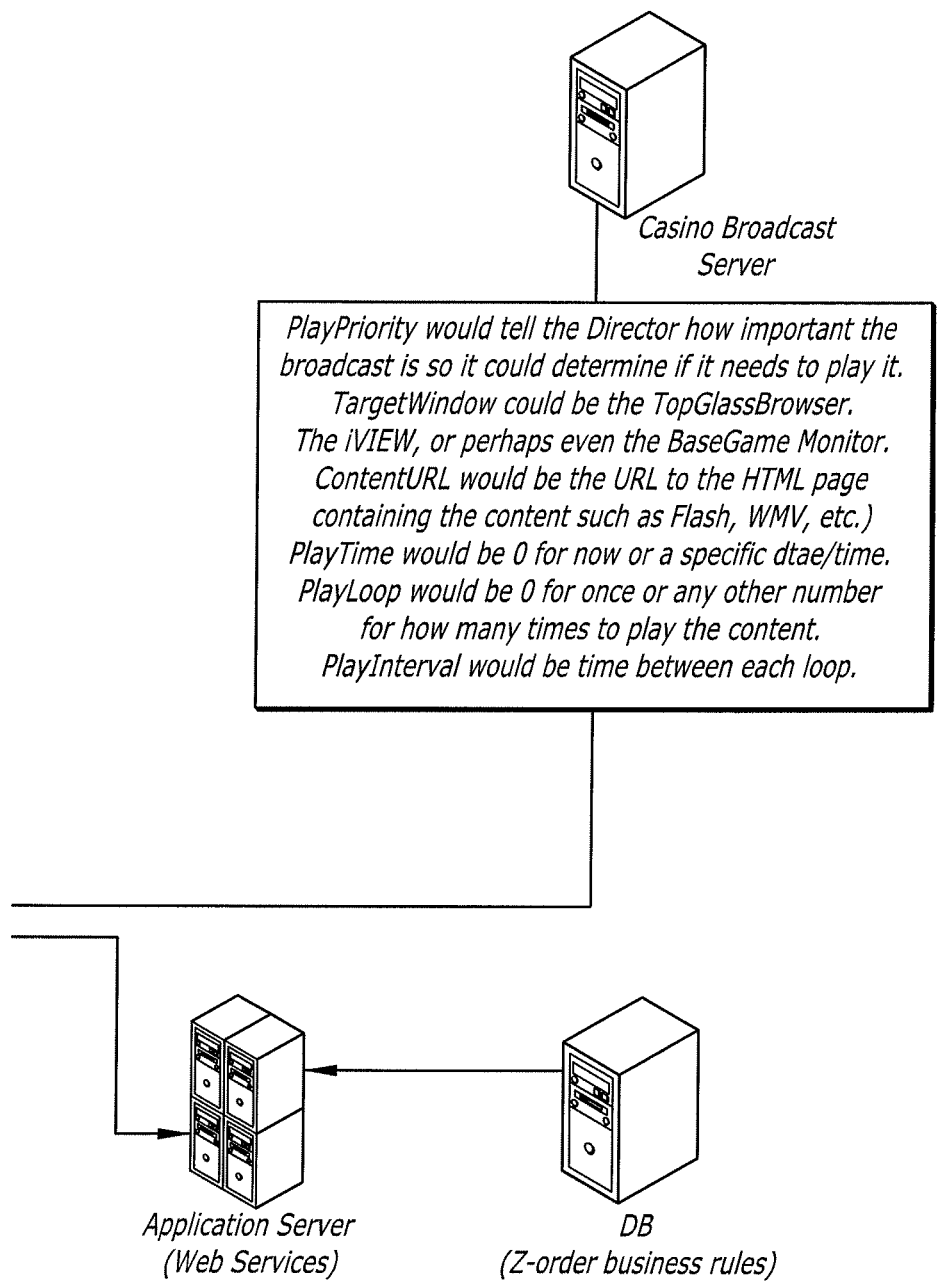

Setzorders
As shown in FIG. 11, the Setzorders message is used to set the Z-orders of the browser window(s).
Parameters:

| | |
|---|---|
| NumWindows [for each window] | Number of windows |
| WndID | Window ID |
| Z order | Z-order of window |

Execjavascriptfunction
The Execjavascriptfunction message is used to execute a Javascript function on the page. It is powerful in the sense that the host can send commands to execute predefined functions on the page when it needs to. For example, when the AppServer needs to catch the attention of all its players, it can send a RequestAttention( ) message to the Browser Manager 100. The Browser Manager 100 may identify which Player Terminals are currently using that application and send this message with a function (e.g., StartFlash( )) to execute. This function may have been previously written to flash(/colorloop) the application button in the panel.
Parameters:

| | |
|---|---|
| WndID | Window ID |
| function | String containing the function to execute with parameters |

Browser Manager to Appserver Messaging is ready

This message is used by the Browser Manager 100 to query the AppServer if it is online and ready to take on another player. The AppServer needs to respond within a predefined amount of time (ms).

Registerpt

After the Browser Manager 100 instructs the Player Terminal to load an application, it sends the Registerpt message to the AppServer to have it register/add the Player Terminal to its list.
Parameters:

| | |
|---|---|
| PT-ID | Unique identifier for the PT. |
| Player ID | Player tracking ID, if available. |

Unregisterpt

At the end of a Player Terminal session, the Browser Manager 100 sends the Unregisterpt message to the AppServer to have it unregister/remove the Player Terminal from its list.
Parameters:

| | |
|---|---|
| PT-ID | Unique identifier for the PT. |

Updateptstatus

The Browser Manager 100 can use the Updateptstatus message to the AppServer to update the status of the Player Terminal. For example, if a Player. Terminal goes down, Browser Manager 100 realizes the Player Terminal went offline and informs the AppServer that the Player Terminal is offline using this message.
Parameters:

| | |
|---|---|
| PT-ID | Unique identifier for the PT. |
| Player ID | Player tracking ID, if available. |
| status | Online/offline. |

Appserver to Browser Manager Messaging—Register

This message is sent by the AppServer on startup to register itself with the Browser Manager 100 and announce its availability.

Heartbeat

The Heartbeat message is sent by the Player Terminal to the Browser Manager 100, to inform Browser Manager that Player Terminal is still alive.

Requestattention

The Requestattention message is sent by the AppServer to the Browser Manager 100 to get the attention of any/all players using the application. The Browser Manager 100 in turn may use the ExecJavascriptFunction message to flash the application button in the panels of the specified Player Terminal(s) currently using the application. If a Player Terminal-ID is specified, the message may be sent to the specified Player Terminal. If it is absent, the message may be sent to all Player Terminals.
Parameters:

| | |
|---|---|
| appid | Unique ID identifying the application |
| PT-ID | Unique ID identifying the PT |

Execjavascriptfunction

The Execjavascriptfunction message is sent by the AppServer to the Browser Manager 100, to execute a Javascript function on the page. If the Player Terminal-ID is present, Browser Manager 100 may send the message to the specified Player Terminal. If the Player Terminal-ID is absent, Browser Manager 100 may forward the message to all Player Terminals. An example of this is when events occur at the AppServer, and say it has a new total value that it needs to have updated on every Player Terminals browser. It may send this message to the Browser Manager 100 with a blank Player Terminal-ID parameter and function string "updateTotal(total)." The Browser Manager 100 may then send this message out to all the Player Terminals who are running that application.
Parameters:

| | |
|---|---|
| appid | Unique ID identifying the application. |
| PT-ID | Unique ID identifying the PT. |
| Function | String containing full script function with parameters. |

Newbrowserwindows

The Newbrowserwindows message may be sent by the AppServer to the Browser Manager 100, to open a new browser window in the CHILD_PANEL. For example, if the AppServer wants to popup a window with a promotional page or have the user make some selections, it could request the Browser Manager 100 to open a new browser window. If no Player Terminal-ID is specified, the message may be sent to all Player Terminals currently displaying the application.

The Z order may be relative to the Z order of the parent window and may be in the range 2-ACTIVE_Z. The coordinates of the new window may be contained by Browser Manager 100 to within the panel of the parent application.
Parameters:

| | |
|---|---|
| appid | Unique ID identifying the application |
| PT-ID | Unique ID identifying the PT |
| NumWindows | Number of windows |
| [for each window] | |
| WndID | Window ID generated by the AppServer |
| X | Window Left |
| Y | Window Top |
| W | Window Width |
| H | Window Height |
| Z order | Z order of the window relative to parent window |
| url | URL the window needs to display |

Movebrowserwindows

The Movebrowserwindows message may be sent by the AppServer to the Browser Manager 100, to reposition a browser window in the CHILD_PANEL. The coordinates of the new window may be contained by Browser Manager 100, to within the panel of the parent application. If no Player Terminal-ID is specified, the message may be sent to all Player Terminals currently displaying the application.
Parameters:

| appid | Unique ID identifying the application |
|---|---|
| PT-ID | Unique ID identifying the PT |
| NumWindows | Number of windows |
| [for each window] | |
| WndID | Window ID as determined by the AppServer |
| X | Window Left |
| Y | Window Top |
| W | Window Width |
| H | Window Height |

Setwindowsurls

The Setwindowsurls message is used to set the URL in the Window ID specified. If no Player Terminal-ID is specified, the message may be sent to all Player Terminals currently displaying the application.
Parameters:

| appid | Unique ID identifying the application |
|---|---|
| PT-ID | Unique ID identifying the PT |
| NumWindows | Number of windows |
| [for each window] | |
| WndID | Window ID |
| url | URL the window needs to display |

Showbrowserwindows

The Showbrowserwindows message is used to set the visibility of the browser window. If no Player Terminal-ID is specified, the message may be sent to all Player Terminals currently displaying the application.
Parameters:

| appid | Unique ID identifying the application |
|---|---|
| PT-ID | Unique ID identifying the PT |
| NumWindows | Number of windows |
| [for each window] | |
| WndID | Window ID |
| show | Flag indicating whether the window is to be shown or not |

Setzorders

The Setzorders message is variable length depending on the number of windows. If no Player Terminal-ID is specified, the message may be sent to all Player Terminals currently displaying the application.
Parameters:

| appid | Unique ID identifying the application |
|---|---|
| PT-ID | Unique ID identifying the PT |
| NumWindows | Number of windows |
| [for each window] | |
| WndID | Window ID |
| Z order | Z-order of window |

Closebrowserwindows

The Closebrowserwindows message may be sent by the AppServer to the Browser Manager 100, to close browser windows in the CHILD_PANEL. If no Player Terminal-ID is specified, the message may be sent to all Player Terminals displaying the application at that moment.
Parameters:

| appid | Unique ID identifying the application |
|---|---|
| PT-ID | Unique ID identifying the PT |
| NumWindows | Number of windows |
| [for each window] | |
| WndID | Window ID as determined by the AppServer |

Startgame

The Startgame message is sent by the AppServer to Browser Manager 100 to let it know a game indicated by gameID has started.
Parameters:

| appid | Unique ID identifying the application |
|---|---|
| PT-ID | Unique ID identifying the PT |
| gameID | ID of the game |

Endgame

The Endgame message is sent by the AppServer to Browser Manager 100 to let it know a game indicated by gameID has ended.
Parameters:

| appid | Unique ID identifying the application |
|---|---|
| PT-ID | Unique ID identifying the PT |
| gameID | ID of the game |

The following are messages used to update the items representing the AppServer in the Browser Manager's database.

Setdescription

The Setdescription message is sent by the AppServer to Browser Manager 100 to set the description of the application in Browser Manager's table 'tblApps.'
Parameters:

| appid | Unique ID identifying the application |
|---|---|
| Description | New description string to set in the table |

Seticonurl

The Seticonurl message is sent by the AppServer to Browser Manager 100 to set the URL of the icon representing it in the Browser Manager's table 'tblApps.'
Parameters:

| appid | Unique ID identifying the application |
|---|---|
| IconURL | New URL of icon to set in the table |

Seticontext

The Seticontext message is sent by the AppServer to Browser Manager 100 to set the text of the icon representing it in the Browser Manager table 'tblApps.'

Parameters:

| | |
|---|---|
| appid | Unique ID identifying the application |
| IconText | New icon text string to set in the table |

Setappurl

The Setappurl message is sent by the AppServer to Browser Manager 100 to set the URL of the application in the Browser Manager table 'tblApps.'
Parameters:

| | |
|---|---|
| appid | Unique ID identifying the application |
| appURL | New URL that points to the live application to set in the table |

Transaction Messaging: Appserver To Transaction Manager—Requesttransaction

This message is used by the AppServer to request the TransactionMgr for a transaction with a specified Player Terminal.
Parameters:

| | |
|---|---|
| PT-ID | Unique ID identifying the PT |
| TransactionRequestID | Unique ID generated by the AppServer identifying the Transaction request. The Transaction Manager 110 may use this in its response to the AppServer. |
| TransactionType | Type of transaction, Debit, Credit |
| Amount | Money amount |

Transaction Manager To Appserver—Transactionresponse

This message is used by the TransactionMgr to respond to AppServer's RequestTransaction message.
Parameters:

| | |
|---|---|
| TransactionRequestID | Unique ID identifying the Transaction request previously sent by the AppServer. |
| Status | Completed, Denied |

Figure 12:
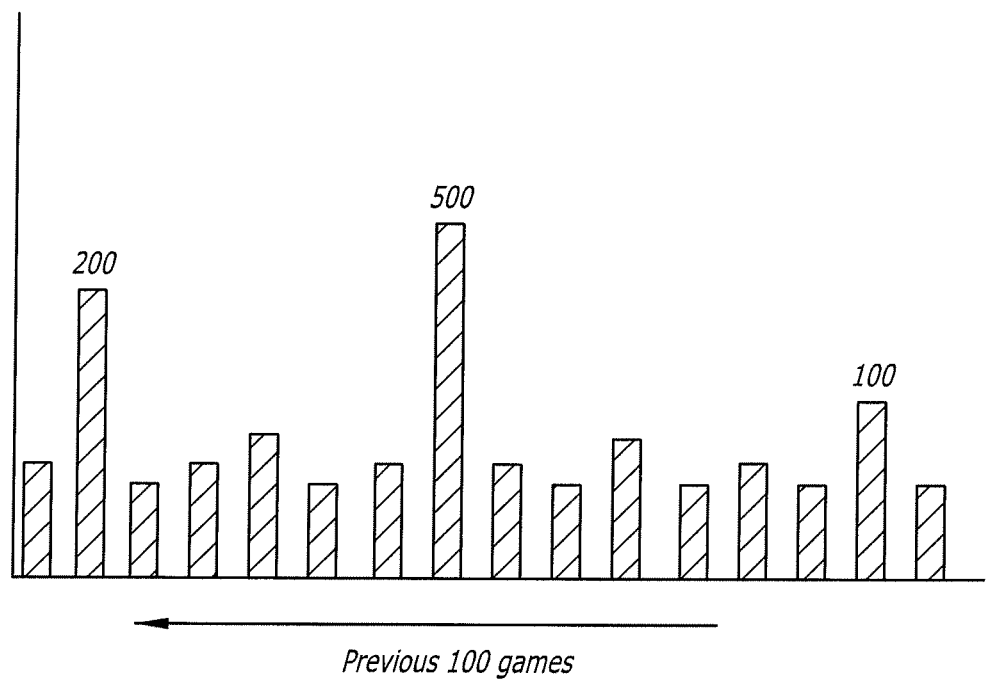
FIG. 12 is a user interface for a player who selects the Slot Stats application showing recent win/loss activity on the gaming device through the browser interface.

FIG. 12 illustrates a Browser Application entitled Slot-Stats. SlotStats is a server application that generates a chart based on game data of individual Player Terminal/electronic gaming machines. The chart may be displayed on a browser window on the Player Terminal.

When a game is played on a Player Terminal, the results (e.g., money played, money won, games played, games won, and the like) are sent to a server that records it in a database with a timestamp. The amount of information to be sent/stored depends on what is to be displayed. For example, the diagram below shows the last 100 games played on the Player Terminal and certain wins have icons displayed on them. This presentation uses just the MoneyWon data field. Additionally, FIG. 1 displays the browser button interface for the player to launch the SlotStats data viewer.

In one embodiment of the browser manager operating system, GnuPlot, a freeware charting tool is used to generate charts via several web sites (e.g., Yahoo Finance). Additional embodiments have also implemented GnuPlot, MySQL and Apache. In one specific, non-limiting embodiment, when a game ends, gamemgr sends the meter data to a client program, which calls a PHP script on the server with the data. The PHP script writes the data into a MySQL table and sends a URL server://draw_chart.php back to the client program. The client program instructs the browser to load the URL server://draw_chart.php with some parameters. On the server side, the draw_chart.php script runs the gnuplot program with the parameters, generates the chart as a PNG image, and the output is fed directly into the page. No images are saved on the server and since the logic to generate the charts resides on the server, any number of different presentations and styles could be used.

One operation that the GnuPlot is unable to do at the time of writing is generate the icons on a plot. To accomplish this operation, a feature request has to be sent to the GnuPlot project. Alternate approaches could be used in other embodiments that utilize MACROMEDIA FLASH, or other charting tools.

Player Initiated "View Base Game" Interface

Referring again to FIG. 1, in one embodiment of the browser manager operating system and method 10, there is a button on the task bar at the bottom of the display screen that reads "View Base Game." This button enables a player to navigate back to the base game screen upon his selection of the button. In this manner, a player may recover the typical top monitor game art in either full screen or in a panel at the top of the display screen. Additionally, in one embodiment, the content may be maximized or displayed within one of the browser windows on the top of the page, in a Picture-in-Picture type format. Accordingly, a player may select any button on the bottom task bar of FIG. 1 and take over any browser window on the display screen (e.g., top, bottom, or display content simultaneously over multiple windows).

Taskbar/Button Bar Minimization

Referring again to FIG. 1, in one embodiment of the browser manager operating system and method 10, there is a button on the task bar at the bottom of the display screen that reads "Min/Max Window." This button may be utilized to either minimize or maximize the selected active window on the display screen. In one embodiment, this task bar may "auto-hide" itself after a period of no user interfacing with the display screen or gaming machine base game input/output (I/O).

Thus, the "Min/Max Window" button may be utilized to provide a full screen view of the content on the upper portion of the display screen. The ability of the task bar to auto-hide provides a non-obstructed view of the browser content on the display screen. The auto hide feature may be driven by the Browser Manager and may be based upon business rules, data it receives from the gaming machines, commands from the gaming machine or a back-end server, or combinations thereof.

Base Game Capture Focus

In another embodiment of the browser manager operating system and method 10, in a situation when the base game requires focus on the top monitor to run an application (e.g., a bonus round), the system enables the base game to take over the entire screen or the top panel of the screen automatically. In one embodiment, the content shown is rendered by native Linux graphics technology (driven from the C++ Linux AGK or OS). In this regard, the game knows its own game state and is capable of selectively take control of an active window on the display screen. In one embodiment, this is due to the game having master control as a result of being a regulated gaming machine. Additionally, the game may give up control of the active window on the display screen when the game has completed its priority content (e.g., it is only showing the game marquee logo).

Drag/Drop/Resize/Re-Position by Player

In one embodiment of the browser manager operating system and method 10, the player has the ability to drag and drop the browser windows in various positions around the display screen. In one specific, non-limiting embodiment, this may be achieved by using a player's finger to drag the windows. In such an embodiment, this feature overrides the default browser or window configuration of the Browser Manager. Additionally, in one embodiment, the player has the ability to resize each window with controls that are displayed around the corner of a window, upon selection of the window by the player. In one embodiment, the content within the window is scaled accordingly. Alternatively, the content in a smaller window remains at the original size, and the player then may only view a portion of the content in the smaller window at a time. In such an embodiment, the player may slide the original size content around within the smaller window using a hand/finger gesture and a slider bar. Such an embodiment enables a player to view the content in its original size and complexity, in comparison to a scaled version of the content.

Save Browser State Per Player

In one embodiment of the browser manager operating system and method 10, the browser window state, size, orientation may be stored in a player-specific "Save State" account. In such an embodiment, a player may visit another gaming machine (or the same gaming machine) at a later time/day, and recover the browser state information upon player identification at the gaming machine. This may be achieved using system controls, biometric identification, a player card reader attached to the gaming device or system control, proximity detection of a player ID from a wireless PDK personal digital key, a smart card, the player entering username/password or casino player ID into the gaming device using a keyboard or touchscreen, facial recognition, a ticket/voucher that is associated with the player, or combinations thereof.

Once the browser state information is recovered, the entire screen browser configuration may be set to the players preferred presentation mode. In one embodiment, this is controlled by the Browser Manager, which overrides the defaults for this specific player. Preferably, the content is identical if the subsequent visited game screen configuration-size-orientation is the same as the previous one that was configured. If screen orientations/sizes/resolutions are different on different gaming machines, the Save State server can save the player browser preferences for each of the various cabinet configurations.

Save Browser State Information for a Selected URL Per Player

In another embodiment of the browser manager operating system and method 10, the "Save State" feature of the browser windows may also save the XML string of the state of the HTML page in that window. Thus, a third party server that is driving this window may use the gaming machine manufacturer to maintain the state of any content in the window by calling a javascript function that the manufacturer provides to the third party. In this regard, the XML string may be saved in the "Save State" server file of the casino Browser Manager that is specific to this player. Such an embodiment enables a patron to start a browser session at a specific URL at another gaming machine with the same state where the player left off on a previously used gaming machine.

For example, in one specific, non-limiting embodiment for an e-commerce shopping application, a casino patron may add items to a virtual shopping basket on one gaming machine, leave this gaming machine, go to another gaming machine, and upon identifying himself continue shopping right where the player left off on the previous gaming machine. In an alternative embodiment, the third party server may use a S2S (server to server) "Save State" message into the manufacturer's "Save State" server to save any browser state-related data it requires. In one embodiment, this is preformed in XML format. In this regard, the gaming machine manufacturer can return this data to the third party server once the player is identified. The third party server may use this recovered browser state data to update its web page state. This is typically performed through AJAX (Asynchronous JavaScript and XML) updates.

Browser Recovery to Normal State

In still another embodiment of the browser manager operating system and method 10, when the player session ends (e.g., credits go to zero for a period of time, or the player card is pulled) then the browser content returns back to its original browser manager controlled frames and sizes. This typically provides the base game focus of the main portion of the top monitor. In yet another embodiment, the Browser Manager or Z-order director server may "auto-flip" through various content and URLs on the top monitor including the natively-rendered, base game content.

Base Game Rendered Native Content

In one embodiment of the browser manager operating system and method 10, the base game operating system may provide a HTML page for the Browser Manager to render. This HTML page contains the top box monitor content, such as the marquee artwork. It may have animated graphics and data fields like paytables and progressives. This data may be updated by AJAX and Dynamic HTML. In this manner, the gaming machine operating system (e.g., an Alpha OS) also acts a web server to provide the base game content to the browser window running on the top display screen. These operating system HTML pages may be pre-entered into the Browser Manager and may be different for each gaming machine, since each machine has different directory paths to its content.

Browser Window Transparency

In another embodiment, the browser manager operating system and method 10 enables a player to select the level of transparency for each browser window via the user interface. This enables the player to see content on one browser window that is behind another browser window. In this manner, the player may be sure to see all of the information the player believes is important. For example, the player may see an active keno game being played on the foremost window and also watch the base game content in the second window back that is completely or partially behind the front-most keno window. In one embodiment, the player is provided a slider bar user interface or dropdown user interface component to set the level of transparency per window or for the level of transparency for all windows. Alternatively, there may be a control panel user interface that allows the player to configure all windows or specific windows to the player's preferences. Additionally, this information can also be saved in a player-centric database that may be recovered in the player's next gaming session on the same or a different gaming machine.

Picture-in-Picture

In one specific, non-limiting embodiment of the browser manager operating system and method 10, a windows-based iVIEW drives either a smaller iVIEW 640×240 window or the entire top box display screen using. MICROSOFT DIRECT X APIs, which are contained in WINDOWS VISTA EMBEDDED. In other embodiments, other components with equivalent functionality may be utilized. This feature enables picture-in-picture functionality in conjunction with variable browser window transparency, which is selectable by the player and is savable in a central "Save State" server per player and gaming machine configuration. Moreover, in some embodiments, the Browser Manager also has the ability to configure the transparency per window or for a group of windows.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed is:

1. A method of using a browser manager to present and control two or more browsers on one or more gaming machines from a server via a network, wherein each gaming machine includes a primary display and a secondary display, the method comprising:
creating two or more browser windows on a display of a gaming machine from the server;
positioning two or more browser windows next to each other on a display of a gaming machine from the server in an X-Y plane of a coordinate system; and
positioning an order of two or more browser windows on top of each other on a display of a gaming machine from the server along a Z axis of the coordinate system, wherein one of the two or more browser windows is a parent browser window and remaining browser windows are child browser windows, and wherein browser layout management incorporates prioritization of the parent browser window.

2. The method of claim 1, wherein one of the two or more browser windows is linked to a universal resource locator (URL).

3. The method of claim 1, wherein each of the browser windows is linked to a different universal resource locator (URL).

4. The method of claim 1, wherein one of the two or more browser windows is linked to an application.

5. The method of claim 1, wherein each of the browser windows is linked to an application.

6. The method of claim 1, wherein the parent browser window maintains the highest Z axis position on the display.

7. The method of claim 1, wherein parent browser window status can be changed to child browser window status by the server via the network, and wherein child browser window status can be changed to parent browser window status by the server via the network.

8. The method of claim 1, wherein child browser window positioning is based off of parent window position as a frame of reference.

9. The method of claim 1, wherein a new browser window is creatable on the display screen at the highest Z axis position, relative to other browser windows, to alert a player of priority information.

10. The method of claim 1, wherein a new browser window is creatable on the display screen of a gaming machine to deliver a message to a player.

11. The method of claim 1, wherein a child browser window is emphasized on the display screen to alert a player of priority information relating to the child browser window to encourage a player to re-designate the child browser window as the parent browser window.

12. The method of claim 1, wherein a button is emphasized on the display screen that is associated with a particular browser window to alert a player of priority information relating to that browser window.

13. The method of claim 12, wherein a button is emphasized on the display screen that is associated with a particular browser window by flashing.

14. The method of claim 13, wherein a button is emphasized on the display screen that is associated with a particular browser window by flashing a specific color.

15. The method of claim 13, wherein a button is emphasized on the display screen that is associated with a particular browser window by flashing one of a variety of colors, wherein each color corresponds to a different message or announcement.

16. A method of using a browser manager to present and control two or more browsers on one or more gaming machines from a server via a network, wherein each gaming machine includes a primary display and a secondary display, the method comprising:
creating two or more browser windows on a display of a gaming machine from the server;
positioning two or more browser windows next to each other on a display of a gaming machine from the server in an X-Y plane of a coordinate system; and
positioning an order of two or more browser windows on top of each other on a display of a gaming machine from the server along a Z axis of the coordinate system, wherein one of the two or more browser windows is a parent browser window and remaining browser windows are child browser windows, and wherein parent browser window status can be changed to child browser window status by the server via the network, and wherein child browser window status can be changed to parent browser window status by the server via the network.

17. The method of claim 16, wherein one of the two or more browser windows is linked to a universal resource locator (URL).

18. The method of claim 16, wherein each of the browser windows is linked to a different universal resource locator (URL).

19. The method of claim 16, wherein one of the two or more browser windows is linked to an application.

20. The method of claim 16, wherein each of the browser windows is linked to an application.

21. The method of claim 16, wherein the parent browser window maintains the highest Z axis position on the display.

22. The method of claim 16, wherein child browser window positioning is based off of parent window position as a frame of reference.

23. The method of claim 16, wherein a new browser window is creatable on the display screen at the highest Z axis position, relative to other browser windows, to alert a player of priority information.

24. The method of claim 16, wherein a new browser window is creatable on the display screen of a gaming machine to deliver a message to a player.

25. The method of claim 16, wherein a child browser window is emphasized on the display screen to alert a player of priority information relating to the child browser window to encourage a player to re-designate the child browser window as the parent browser window.

26. The method of claim 16, wherein a button is emphasized on the display screen that is associated with a particular browser window to alert a player of priority information relating to that browser window.

27. The method of claim 16, wherein a button is emphasized on the display screen that is associated with a particular browser window by flashing.

28. The method of claim 16, wherein a button is emphasized on the display screen that is associated with a particular browser window by flashing a specific color.

29. The method of claim 16, wherein a button is emphasized on the display screen that is associated with a particular browser window by flashing one of a variety of colors, wherein each color corresponds to a different message or announcement.

30. A method of using a browser manager to present and control two or more browsers on one or more gaming machines from a server via a network, wherein each gaming machine includes a primary display and a secondary display, the method comprising:

creating two or more browser windows on a display of a gaming machine from the server;

positioning two or more browser windows next to each other on a display of a gaming machine from the server in an X-Y plane of a coordinate system; and positioning an order of two or more browser windows on top of each other on a display of a gaming machine from the server along a Z axis of the coordinate system, wherein one of the two or more browser windows is a parent browser window and remaining browser windows are child browser windows, and wherein a child browser window is emphasized on the display screen to alert a player of priority information relating to the child browser window to encourage a player to re-designate the child browser window as the parent browser window.

* * * * *

UNITED STATES PATENT AND TRADEMARK OFFICE
CERTIFICATE OF CORRECTION

| | | |
|---|---|---|
| PATENT NO. | : 8,429,224 B2 | Page 1 of 1 |
| APPLICATION NO. | : 11/938746 | |
| DATED | : April 23, 2013 | |
| INVENTOR(S) | : Pravinkumar Patel et al. | |

It is certified that error appears in the above-identified patent and that said Letters Patent is hereby corrected as shown below:

Title Page, (75), change "Robert W. Crowder" to --Robert W. Crowder, Jr.--

Title Page, (63), delete "No. 11/938,746, filed on Nov. 12, 2007, which is a continuation of application"

In the Specification

Column 1, In line 19, delete "11/938,746, filed Nov. 12, 2007 which is a"

Column 1, In line 20, delete "continuation of U.S. patent application Ser. No."

Column 3, In line 46, delete "." after "like"

Column 22, In line 49, delete "." after "8"

Signed and Sealed this
Eighteenth Day of March, 2014

Michelle K. Lee
*Deputy Director of the United States Patent and Trademark Office*